United States Patent
Patton et al.

(10) Patent No.: US 10,465,020 B2
(45) Date of Patent: Nov. 5, 2019

(54) PROCESS FOR PRODUCING A POLYOLEFIN

(71) Applicant: Dow Global Technologies LLC, Midland, MI (US)

(72) Inventors: Jasson T. Patton, Midland, MI (US); Todd D. Senecal, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/577,562

(22) PCT Filed: May 27, 2016

(86) PCT No.: PCT/US2016/034656
§ 371 (c)(1),
(2) Date: Nov. 28, 2017

(87) PCT Pub. No.: WO2016/196293
PCT Pub. Date: Dec. 8, 2016

(65) Prior Publication Data
US 2018/0171041 A1  Jun. 21, 2018

Related U.S. Application Data

(60) Provisional application No. 62/168,485, filed on May 29, 2015.

(51) Int. Cl.
| | | |
|---|---|---|
| C08F 4/44 | (2006.01) | |
| C08F 10/00 | (2006.01) | |
| C08F 10/02 | (2006.01) | |
| C08F 210/16 | (2006.01) | |
| C08F 2/04 | (2006.01) | |
| C08F 2/34 | (2006.01) | |
| C08F 4/58 | (2006.01) | |

(52) U.S. Cl.
CPC .............. C08F 10/02 (2013.01); C08F 2/04 (2013.01); C08F 2/34 (2013.01); C08F 4/44 (2013.01); C08F 4/58 (2013.01); C08F 210/16 (2013.01); C08F 2420/02 (2013.01)

(58) Field of Classification Search
CPC ...... C08F 4/6592; C08F 10/02; C08F 210/16; C08F 4/44
See application file for complete search history.

(56) References Cited

U.S. PATENT DOCUMENTS

| | | | |
|---|---|---|---|
| 4,808,561 A | 2/1989 | Welborn, Jr. | |
| 4,912,075 A | 3/1990 | Chang | |
| 4,914,253 A | 4/1990 | Chang | |
| 5,008,228 A | 4/1991 | Chang | |
| 5,086,025 A | 2/1992 | Chang | |
| 5,464,906 A | 11/1995 | Patton et al. | |
| 6,268,444 B1 * | 7/2001 | Klosin | C07F 7/10 526/127 |
| 6,555,634 B1 * | 4/2003 | Klosin | C07F 17/00 502/103 |
| 7,851,569 B2 | 12/2010 | Senda et al. | |

FOREIGN PATENT DOCUMENTS

| | | |
|---|---|---|
| WO | 9743294 A1 | 11/1997 |
| WO | 0018808 A1 | 4/2000 |
| WO | 2004078795 A2 | 9/2004 |

OTHER PUBLICATIONS

Harder, Sjoerd, "Syntheses and Structures of Homoleptic Lanthanide Complexes with Chelating o-Dimethylaminobenzyl Ligands: Key Precursors in Lanthanide Chemistry", Organometallics, 2005, 24, 373-379.
Hou et al., "Lanthanide(II) Complexes Bearing Linked Cyclopentadienyl-Anilido Ligands: Synthesis, Structures, and One-Electron-Transfer and Ethylene Polymerization Reactions", Organometallics, 2001, 20, 3323-3328.
Hultzsch et al., "Single-Component Polymerization Catalysts for Ethylene and Styrene: Synthesis, Characterization and Reactivity of Alkyl and Hydrido Yttrium Complexes Containing a Linked Amido-Cyclopentadienyl Ligand", Organometallics, 2000, 19, 228-243.
Jende et al., "Rare-Earth-Metal Allyl Complexes Supported by the [2-(N,N-Dimethylamino)ethyl] tetramethylcyclopentadienyl Ligand: Structural Characterization, Reactivity, and Isoprene Polymerization", Organometallics, 2015, 34, 32-41.
Jian et al., "Rare-Earth-Metal-Hydrocarbyl Complexes Bearing Linked Cyclopentadienyl or Fluorenyl Ligands: Synthesis, Catalyzed Styrene Polymerization, and Structure-Reactivity Relationship", Chem. Eur. J., 2012, 18, 2674-2684.
Krillov et al., ""Constrained Geometry" Group 3 Metal Complexes of the Fluorenyl-Based Ligands [(3,6-tBu2Flu) SiR2NtBu]: Synthesis, Structural Characterization, and Polymerization Activity", Organometallics, 2003, 22, 4467-4479.
Luo et al., "Half-sandwich Rare-Earth-Metal Derivatives Bearing Pyrrolidinyl-Functionalized Cyclopentadienyl Ligand: Synthesis, Characterization and Catalysis in Syndiospecific Polymerization of Styrene", New J. Chem., 2013, 37, 2675-2682.
Shapiro et al., "[{ ( v5-05Me,)Me2Si( g'-NCMe,)]( PMe,)ScH],: A Unique Example of a Single-Component a-Olefin Polymerization Catalyst", Organometallics, 1990, 9, 867-869.

(Continued)

Primary Examiner — Caixia Lu
(74) Attorney, Agent, or Firm — Dinsmore & Shohl LLP

(57) ABSTRACT

A process for producing a polyolefin comprising contacting one or more olefinic monomers in the presence of one or more catalysts, wherein one or more of the catalysts has the following structure: wherein M is a Group III or Lanthanide metal that is in a +3 formal oxidation state and wherein the contacting occurs in the absence of any activator is provided.

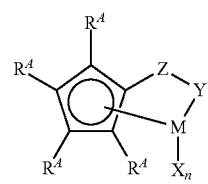

10 Claims, No Drawings

(56) References Cited

OTHER PUBLICATIONS

Zhang et al., "Half-Sandwich o-N,N-Dimethylaminobenzyl Complexes over the Full Size Range of Group 3 and Lanthanide Metals. Synthesis, Structural Characterization, and Catalysis of Phosphine PH Bond Addition to Carbodiimides", Chem. Eur. J., 2008, 14, 2167-2179.

International Search Report and Written Opinion pertaining to PCT/US2016/034656 dated Sep. 9, 2016.

International Preliminary Report on Patentability pertaining to PCT/US2016/034656 dated Dec. 5, 2017.

* cited by examiner

PROCESS FOR PRODUCING A POLYOLEFIN

FIELD OF THE DISCLOSURE

The instant invention relates to a process for producing a polyolefin comprising contacting one or more olefinic monomers in the presence of one or more catalysts, wherein one or more of the catalysts has the following structure:

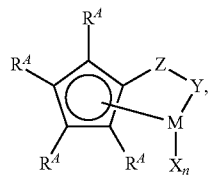

wherein M is a Group III or Lanthanide metal that is in a +3 formal oxidation state and wherein the contacting occurs in the absence of any activator and/or chain transfer agent.

BACKGROUND OF THE DISCLOSURE

Olefin based polymers such as polyethylene are produced via various catalyst systems and polymerization processes. Selection of such catalyst systems used in the polymerization process of the olefin based polymers is an important factor contributing to the characteristics and properties of such olefin based polymers.

The polyolefin polymerization process can be varied in a number of ways to produce a wide variety of resultant polyolefin resins having different physical properties suitable for use in different applications. It is generally known that polyolefin can be produced in a solution phase polymerization process, gas phase polymerization process, and/or slurry phase polymerization process in one or more reactors, for example, connected in series or parallel, in the presence of one or more catalyst systems. The use of activating agents in polyolefin polymerization process to activate the pre-catalyst composition is generally known. Certain pre-catalysts, for example, require an activating agent such as dihydrogen to become catalytically activate for olefin polymerization. For example, dihydrogen has been shown to activate bis(trimethylsilyl)methyl scandium pre-catalyst (Catalyst 1). However, the presence of dihydrogen also leads to termination of the growing polymer chains via σ-bond metathesis with metal-polymer bonds, and as a result a decrease in polymer molecular weight is observed.

Catalyst 1

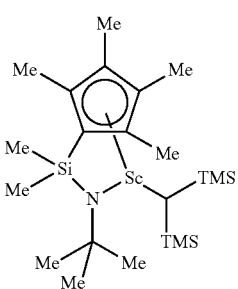

Accordingly, there is a need for a catalyst composition suitable for polymerization process in the absence of activators, e.g. dihydrogen.

SUMMARY OF THE DISCLOSURE

In one embodiment, the instant invention provides a process for producing a polyolefin comprising contacting one or more olefinic monomers in the presence of one or more catalysts, wherein one or more of the catalysts has the following structure:

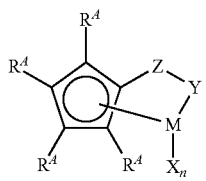

wherein M is a Group III or Lanthanide metal that is in a +3 formal oxidation state; $R^A$, independent in each occurrence, is selected from the group consisting of $(C_1-C_{40})$ hydrocarbyl; $(C_1-C_{40})$heterohydrocarbyl; $Si(R^B)_3$; $Ge(R^B)_3$; $P(R^B)_2$; $N(R^B)_2$; $OR^B$; $SR^B$; $NO_2$; $CN$; $CF_3$; $R^BS(O)$—; $R^BS(O)_2$—; $(R^B)_2C=N$—; $R^BC(O)O$—; $R^BOC(O)$—; $R^BC(O)N(R)$—; $(R^B)_2NC(O)$—; halogen atom; hydrogen atom; and any combination thereof; optionally two or more $R^A$ groups can combine together into one or more ring structures, with such ring structures having from 3 to 50 atoms in each ring structure excluding any hydrogen atoms; Z is $[(R^D)_nG]_m$, wherein m=1, 2, 3, or 4, and G is independently selected from carbon, silicon, germanium or boron; and when G is carbon, silicon, or germanium, n=2; when G is boron, n=1; Y is bonded to M and Z and is selected from the group consisting of —O—, —S—, —$NR^E$—, and —$PR^E$—; each $R^B$, $R^D$, or $R^E$ independently is $(C_1-C_{30})$ hydrocarbyl or $(C_1-C_{30})$heterohydrocarbyl; X is $(C_1-C_{40})$ hydrocarbon, $(C_1-C_{40})$heterohydrocarbon $(C_1-C_{40})$hydrocarbyl; $(C_1-C_{40})$heterohydrocarbyl; $Si(R^C)_3$; $Ge(R^C)_3$; $P(R^C)_2$; $N(R^C)_2$; $OR^C$; $SR^C$; CN; $CF_3$, $R^CS(O)$—; $R^CS(O)_2$—; $(R^C)_2C=N$—; $R^CC(O)O$—; $R^COC(O)$—; $R^CC(O)N(R)$—; $(R^C)_2NC(O)$—; halogen atom; or hydrogen atom; each $R^C$ independently is $(C_1-C_{30})$hydrocarbyl or $(C_1-C_{30})$ heterohydrocarbyl; each of the hydrocarbyl, heterohydrocarbyl, $Si(R^C)_3$, $Ge(R^C)_3$, $P(R^C)_2$, $N(R^C)_2$, $OR^C$, $SR^C$, $R^CS(O)$—, $R^CS(O)_2$—, $(R^C)2C=N$—, $R^CC(O)O$—, $R^COC(O)$—, $R^CC(O)N(R)$—, $(R^C)_2NC(O)$—, hydrocarbylene, and heterohydrocarbylene groups independently is unsubstituted or substituted with one or more $R^S$ substituents; each $R^S$ independently is a halogen atom; polyfluoro substitution; perfluoro substitution; unsubstituted $(C_1-C_{18})$alkyl; $F_3C$—; $FCH_2O$—; $F_2HCO$—; $F_3CO$—; $R_3Si$—; $R_3Ge$—; RO—; RS—; RS(O)—; $RS(O)_2$—; $R_2P$—; $R_2N$—; $R_2C=N$—; NC—; RC(O)O—; ROC(O)—; RC(O)N(R)—; or $R_2NC(O)$—; or two of the $R^S$ are taken together to form an unsubstituted $(C_1-C_{18})$alkylene, wherein each R independently is an unsubstituted $(C_1-C_{18})$alkyl; optionally, $R^c$ or $R^S$ may have an additional interaction with M; and wherein no activation agent is required to initiate polymerization.

DETAILED DESCRIPTION OF THE DISCLOSURE

In the present application, any lower limit of a range of numbers, or any preferred lower limit of the range, may be combined with any upper limit of the range, or any preferred upper limit of the range, to define a preferred aspect or embodiment of the range. Each range of numbers includes all numbers, both rational and irrational numbers, subsumed within that range (e.g., the range from about 1 to about 5 includes, for example, 1, 1.5, 2, 2.75, 3, 3.80, 4, and 5).

Certain unsubstituted chemical groups are described herein as having a maximum number of 40 carbon atoms (e.g., $(C_1-C_{40})$hydrocarbyl and $(C_1-C_{40})$heterohydrocarbyl). These include substituent groups (e.g., R groups) and olefin monomers where number of carbon atoms is not critical. Forty carbon atoms in such unsubstituted chemical groups is a practical upper limit; nevertheless in some embodiments the invention contemplates such unsubstituted chemical groups having a maximum number of carbon atoms that is higher than 40 (e.g., 100, 1000, or more).

The word "optionally" means "with or without." For example, "optionally, an additive" means with or without an additive.

In an event where there is a conflict between a compound name and its structure, the structure controls.

An activator is defined as an additive which renders the precatalyst active with respect to olefin polymerization by contacting it to, or combining it with, the precatalyst. There are two types of activators. The first (Type 1), which is most commonly used with Group IV catalysts, abstracts a monoanionic ligand, typically an alkyl group, in some cases a benzyl or methyl group, to form a cationic metal-ligand complex of the precatalyst, which has a weakly coordinating or noncoordinating anion derived or present as a portion of the activating agent. For example, activators of this type include: Brønsted acids, such as $[R_3NH]^+$ (ammonium) based activators, e.g. N,N-dimethylanilinium tetrakis(pentafluorophenyl)borate); and Lewis acids, such as alkyl aluminums, polymeric or oligomeric alumoxanes (also known as aluminoxanes), boranes (such as tris(pentafluorophenyl) borane), or carbocationic species (such as trityl teatrakis (pentafluorophenyl)borate). When an alumoxane alone is used as the activator, preferably the number of moles of the alumoxane that are employed is at least 100 times the number of moles of the metal-ligand complex. Lower loading of alumoxanes do not act as activators, rather they serve as scavenging agent. A scavenging agent sequesters impurities in the reactor prior to addition of the precatalyst, and as such, does not constitute and activator. The second class of activators (Type 2) has shown utility in the activation of Catalyst 1. Unlike the first class, which forms a cation metal-ligand complex upon contacting the precatalyst, this class of activator reacts with the precatalyst via σ-bond metathesis, rendering a catalytically active neutral (uncharged) species. An example of this second type of activator includes dihydrogen.

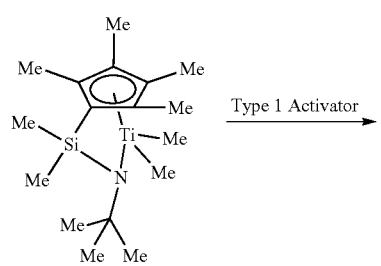

Type 1 Activator

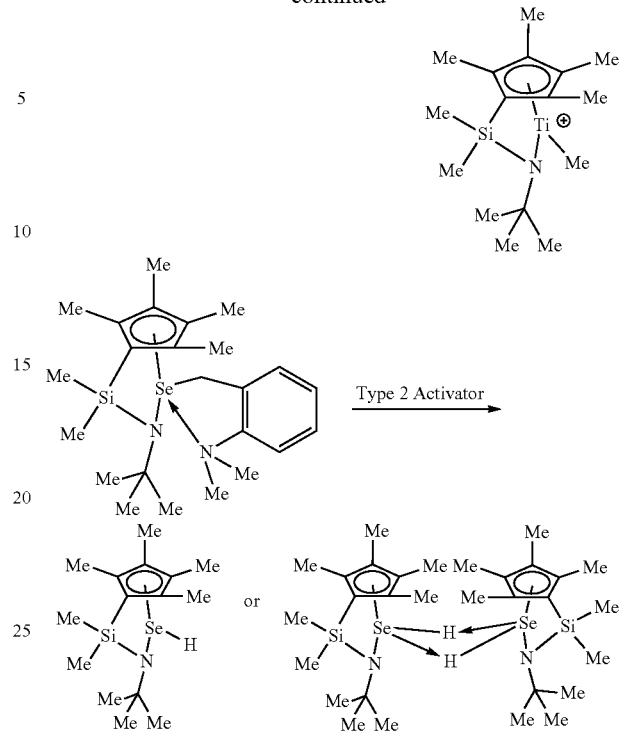

Type 2 Activator

In the process of the present disclosure, one or more olefinic monomers are contacted in the presence of one or more catalysts. Olefinic monomers useful herein include ethylene, 1-propylene, 1-butene, 1-pentene, 1-hexene, 1-cyclohexene, 1-heptene, 4-methyl-1-pentene, 1-octene, styrene, α-methylstyrene, ethylidene norbornene (ENB), vinyl norbornene (VNB). The process of the present disclosure utilizes at least one catalyst having the following structure:

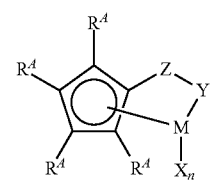

wherein M is a Group III or Lanthanide metal that is in a +3 formal oxidation state. Group III atoms useful in the catalyst include Scandium and Yttrium. Lanthanide metals useful in the catalyst include Lutetium and Erbium.

The group $R^A$ of the catalyst, independent in each occurrence, is selected from the group consisting of $(C_1-C_{40})$ hydrocarbyl; $(C_1-C_{40})$heterohydrocarbyl; $Si(R^B)_3$; $Ge(R^B)_3$; $P(R^B)_2$; $N(R^B)_2$; $OR^B$; $SR^B$; $NO_2$; $CN$; $CF_3$; $R^BS(O)$—; $R^BS(O)_2$—; $(R^B)_2C$=N—; $R^BC(O)O$—; $R^BOC(O)$—; $R^BC(O)N(R)$—; $(R^B)_2NC(O)$—; halogen atom; hydrogen atom; and any combination thereof; wherein each $R^B$ independently is $(C_1-C_{30})$hydrocarbyl or $(C_1-C_{30})$heterohydrocarbyl, as defined herein.

As used herein, the term "$(C_1-C_{40})$hydrocarbon" means a neutral hydrocarbon from 1 to 40 carbon atoms, the term "$(C_1-C_{40})$hydrocarbyl" means a hydrocarbon radical of from 1 to 40 carbon atoms and the term "$(C_1-C_{40})$hydrocarbylene" means a hydrocarbon diradical of from 1 to 40 carbon atoms, wherein each hydrocarbon, radical, and diradical independently is aromatic or non-aromatic, saturated or unsaturated, straight chain or branched chain, cyclic (including mono- and poly-cyclic, fused and non-fused polycyclic) or acyclic, or a combination of two or more thereof; and each hydrocarbon, radical, and diradical is the same as or different from another hydrocarbon, radical, and diradical, respectively, and independently is unsubstituted or substituted by one or more $R^S$.

Preferably, a $(C_1-C_{40})$hydrocarbyl independently is an unsubstituted or substituted $(C_1-C_{40})$alkyl, $(C_3-C_{40})$cycloalkyl, $(C_3-C_{20})$cycloalkyl-$(C_1-C_{20})$alkylene, $(C_6-C_{40})$aryl, or $(C_6-C_{20})$aryl-$(C_1-C_{20})$alkylene. More preferably, a $(C_1-C_{40})$hydrocarbyl independently is an unsubstituted or substituted $(C_1-C_{20})$hydrocarbyl, e.g., $(C_1-C_{20})$alkyl, $(C_3-C_{20})$cycloalkyl, $(C_3-C_{10})$cycloalkyl-$(C_1-C_{10})$alkylene, $(C_6-C_{20})$aryl, or $(C_6-C_{18})$aryl-$(C_1-C_{10})$alkylene. Still more preferably, a $(C_1-C_{40})$hydrocarbyl independently is an unsubstituted or substituted $(C_1-C_{18})$hydrocarbyl, e.g., $(C_1-C_{18})$alkyl, $(C_3-C_{18})$cycloalkyl, $(C_3-C_{12})$cycloalkyl-$(C_1-C_6)$alkylene, $(C_6-C_{18})$aryl, or $(C_6-C_{12})$aryl-$(C_1-C_6)$alkylene. Preferably, any $(C_3-C_{18})$cycloalkyl independently is an unsubstituted or substituted $(C_3-C_{10})$cycloalkyl.

The term "$(C_1-C_{40})$alkyl" means a saturated straight or branched hydrocarbon radical of from 1 to 40 carbon atoms that is unsubstituted or substituted by one or more $R^S$. Examples of unsubstituted $(C_1-C_{40})$alkyl are unsubstituted $(C_1-C_{20})$alkyl; unsubstituted $(C_1-C_{10})$alkyl; unsubstituted $(C_1-C_5)$alkyl; methyl; ethyl; 1-propyl; 2-propyl; 1-butyl; 2-butyl; 2-methylpropyl; 1,1-dimethylethyl; 1-pentyl; 1-hexyl; 1-heptyl; 1-nonyl; and 1-decyl. Examples of substituted $(C_1-C_{40})$alkyl are substituted $(C_1-C_{20})$alkyl, substituted $(C_1-C_{10})$alkyl, trifluoromethyl, and $(C_{45})$alkyl. Preferably, each $(C_1-C_5)$alkyl independently is methyl, trifluoromethyl, ethyl, 1-propyl, or 2-methylethyl.

The term "$(C_1-C_{20})$alkylene" means a saturated straight or branched chain diradical of from 1 to 20 carbon atoms that is unsubstituted or substituted by one or more $R^S$. Preferably, $(C_1-C_{20})$alkylene, together with atoms of formula (I) through which the $(C_1-C_{20})$alkylene is bonded, comprise a 5- or 6-membered ring. Examples of unsubstituted $(C_1-C_{20})$alkylene are unsubstituted $(C_1-C_{10})$alkylene, including unsubstituted 1,2-$(C_1-C_{10})$alkylene; —$CH_2$—, —$CH_2CH_2$—, —$(CH_2)_3$—,

—$(CH_2)_4$—, —$(CH_2)_5$—, —$(CH_2)_6$—, —$(CH_2)_7$—, —$(CH_2)_8$—, and —$(CH_2)_4C(H)(CH_3)$—. Examples of substituted $(C_1-C_{20})$alkylene are substituted $(C_1-C_{10})$alkylene, —$CF_2$—, —$C(O)$—, and —$(CH_2)_{14}C(CH_3)_2(CH_2)_5$— (i.e., a 6,6-dimethyl substituted normal-1,20-eicosylene).

The term "$(C_6-C_{40})$aryl" means an unsubstituted or substituted (by one or more $R^S$) mono- bi- or tricyclic aromatic hydrocarbon radical of from 6 to 40 total carbon atoms, of which at least from 6 to 14 carbon atoms are ring carbon atoms, and the mono-, bi- or tricyclic radical comprises 1, 2 or 3 rings (first, second, and third rings, respectively), wherein any second or third ring independently is fused or non-fused to a first ring or each other, and the first ring is aromatic and, preferably, at least one of any second or third rings is aromatic. Examples of unsubstituted $(C_6-C_{40})$aryl are unsubstituted $(C_6-C_{20})$aryl; unsubstituted $(C_6-C_{18})$aryl; unsubstituted $(C_6-C_{12})$aryl; phenyl; fluorenyl; tetrahydrofluorenyl; indacenyl; hexahydroindacenyl; indenyl; dihydroindenyl; naphthyl; tetrahydronaphthyl; and phenanthrenyl. Examples of substituted $(C_6-C_{40})$aryl are substituted $(C_6-C_{20})$aryl; substituted $(C_6-C_{18})$aryl; substituted $(C_6-C_{12})$aryl; 2-$(C_1-C_5)$alkyl-phenyl; 2,4-bis$(C_1-C_5)$alkyl-phenyl; 2,4-bis[$(C_{20})$alkyl]-phenyl; polyfluorophenyl; pentafluorophenyl; and fluoren-9-one-1-yl. A preferred substituted $(C_6-C_{12})$aryl is a substituted $(C_6)$aryl, more preferably 2,6-bis(1-methylethyl)phenyl.

The term "$(C_3-C_{40})$cycloalkyl" means a saturated cyclic hydrocarbon radical of from 3 to 40 carbon atoms that is unsubstituted or substituted by one or more $R^S$. Examples of unsubstituted $(C_3-C_{40})$cycloalkyl are unsubstituted $(C_3-C_{20})$cycloalkyl, unsubstituted $(C_3-C_{10})$cycloalkyl, cyclopropyl, cyclobutyl, cyclopentyl, cyclohexyl, cycloheptyl, cyclooctyl, cyclononyl, and cyclodecyl. Examples of substituted $(C_3-C_{40})$cycloalkyl are substituted $(C_3-C_{20})$cycloalkyl, substituted $(C_3-C_{10})$cycloalkyl, cyclopentanon-2-yl, and 1-fluorocyclohexyl.

Examples of $(C_1-C_{40})$hydrocarbylene are unsubstituted or substituted $(C_6-C_{40})$arylene, $(C_3-C_{40})$cycloalkylene, and $(C_1-C_{40})$alkylene (e.g., $(C_1-C_{20})$alkylene). In some embodiments, the diradicals are on adjacent carbon atoms (i.e., 1,2-diradicals), or spaced apart by one, two, or more intervening carbon atoms (e.g., respective 1,3-diradicals, 1,4-diradicals, etc.). Preferred is a 1,2-, 1,3-, 1,4-, or an alpha, omega-diradical (i.e., having maximum spacing between the radical carbons), more preferably a 1,2-diradical. More preferred are 1,2-diradical versions of $(C_6-C_{18})$arylene, $(C_3-C_{20})$cycloalkylene, and $(C_2-C_{20})$alkylene.

The term "$(C_1-C_{40})$ heterohydrocarbon" means a neutral heterohydrocarbon of 1 to 40 carbon atoms and one or more heteroatoms such as Ge, Se, B, Si, S, N, O, P or halogen atom; or any combination thereof. The term "halogen atom" means a fluoro (F), chloro (Cl), bromo (Br), or iodo (I) radical. Included within this definition are heteroaromatic rings wherein one or more of the carbon atoms of the aromatic ring are replaced by a heteroatom. Heterohydrocarbon substituents include —$NR^C$—, —$N=$, —$N=R^C$, —$N=PR^C$, —$N(R^C)_2$, —$C\equiv N$, —$O$—, —$OR^C$, —$OC\equiv N$, —$OC(O)R^C$, —$C(O)OR^C$, —$C(O)N(R^C)_2$, —$C(S)N(R^C)_2$, —$SR^C$; —$SC\equiv N$, —$S(O)R^C$, —$S(O)_2R^C$, —$OS(O)R^C$, —$OS(O)_2R^C$, —$Se$—, —$SeR^C$, —$Ge(R^C)_3$, —$Ge(R^C)_2$, —$Si(R^C)_3$, —$Si(R^C)_2$, —$OSi(R^C)_3$, —$P=NR^C$, —$P(OR^C)_2$, and —$P(R^C)_2$, —$OP(O)$—, —$OP(O)(OR^C)_2$, —$P(O)(OR^C)_2$, —$P(O)(R^C)(OR^C)$, —$BR^C_2$, —$BR^C$—, —$B(OR^C)_2$, —$BOR^C$—, —$AlR^C_2$, —$AlR^C$—, —$Al(OR^C)_2$, —$AlOR^C$—; wherein each $R^C$ independently is $(C_1-C_{18})$hydrocarbyl or $(C_1-C_{18})$heterohydrocarbyl. Other heterohydrocarbon substituents are possible and included. Alternatively, when possible, multiple Rc groups may be linked together to form cyclic or polycyclic hydrocarbyl or heterohydrocarbyl structures.

Preferably, a $(C_1-C_{40})$heterohydrocarbyl independently is unsubstituted or substituted $(C_1-C_{40})$heteroalkyl, $(C_2-C_{40})$heterocycloalkyl, $(C_2-C_{40})$heterocycloalkyl-$(C_1-C_{20})$alkylene, $(C_3-C_{40}$cycloalkyl-$(C_1-C_{20})$heteroalkylene, $(C_2-C_{40})$heterocycloalkyl-$(C_1-C_{20})$heteroalkylene, $(C_1-C_{40})$heteroaryl, $(C_1-C_{20})$heteroaryl-$(C_1-C_{20})$alkylene, $(C_6-C_{20})$aryl-$(C_1-C_{20})$heteroalkylene, or $(C_1-C_{20})$heteroaryl-$(C_1-C_{20})$heteroalkylene. More preferably, a $(C_1-C_{40})$heterohydrocarbyl independently is unsubstituted or substituted $(C_1-C_{20})$heterohydrocarbyl, e.g., $(C_1-C_{20})$heteroalkyl, $(C_2-C_{20})$heterocycloalkyl, $(C_2-C_{20})$heterocycloalkyl-$(C_1-C_{20})$alkylene, $(C_3-C_{20})$cycloalkyl-$(C_1-C_{20})$heteroalkylene, $(C_2-C_{20})$heterocycloalkyl-$(C_1-C_{20})$heteroalkylene, $(C_1-C_{20})$heteroaryl, $(C_1-C_{20})$heteroaryl-$(C_1-

$(C_{20})$alkylene, $(C_6-C_{20})$aryl-$(C_1-C_{20})$heteroalkylene, or $(C_1-C_{20})$heteroaryl-$(C_1-C_{20})$heteroalkylene. Still more preferably, a $(C_1-C_{40})$heterohydrocarbyl independently is unsubstituted or substituted $(C_1-C_{18})$heterohydrocarbyl, e.g., $(C_1-C_{18})$heteroalkyl, $(C_2-C_{18})$heterocycloalkyl, $(C_2-C_{12})$heterocycloalkyl-$(C_1-C_6)$alkylene, $(C_3-C_{12})$cycloalkyl-$(C_1-C_6)$heteroalkylene, $(C_2-C_{12})$heterocycloalkyl-$(C_1-C_6)$heteroalkylene, $(C_1-C_{12})$heteroaryl, $(C_1-C_{12})$heteroaryl-$(C_1-C_6)$alkylene, $(C_6-C_{18})$aryl-$(C_1-C_6)$heteroalkylene, or $(C_1-C_{12})$heteroaryl-$(C_1-C_6)$heteroalkylene. Preferably, any $(C_2-C_{18})$heterocycloalkyl independently is unsubstituted or substituted $(C_2-C_9)$heterocycloalkyl.

Examples of $(C_1-C_{40})$heteroalkyl and $(C_1-C_{20})$heteroalkylene are saturated straight or branched chain radical or diradical, respectively, of from 1 to 40 or 1 to 20 carbon atoms, respectively, and one or more of the heteroatoms $Si(R^C)_2$, $P(R^P)$, $N(R^N)$, N, O, S, S(O), and $S(O)_2$ as defined above, wherein the $(C_1-C_{40})$heteroalkyl and $(C_1-C_{20})$heteroalkylene independently are unsubstituted or substituted by one or more $R^S$.

Examples of unsubstituted $(C_2-C_{40})$heterocycloalkyl are unsubstituted $(C_2-C_{20})$heterocycloalkyl, unsubstituted $(C_2-C_{10})$heterocycloalkyl, aziridin-1-yl, oxetan-2-yl, tetrahydrofuran-3-yl, pyrrolidin-1-yl, tetrahydrothiophen-S,S-dioxide-2-yl, morpholin-4-yl, 1,4-dioxan-2-yl, hexahydroazepin-4-yl, 3-oxa-cyclooctyl, 5-thia-cyclononyl, and 2-aza-cyclodecyl.

Examples of unsubstituted $(C_1-C_{40})$heteroaryl are unsubstituted $(C_1-C_{20})$heteroaryl, unsubstituted $(C_1-C_{10})$heteroaryl, pyrrol-1-yl; pyrrol-2-yl; furan-3-yl; thiophen-2-yl; pyrazol-1-yl; isoxazol-2-yl; isothiazol-5-yl; imidazol-2-yl; oxazol-4-yl; thiazol-2-yl; 1,2,4-triazol-1-yl; 1,3,4-oxadiazol-2-yl; 1,3,4-thiadiazol-2-yl; tetrazol-1-yl; tetrazol-2-yl; tetrazol-5-yl; pyridine-2-yl; pyrimidin-2-yl; pyrazin-2-yl; indol-1-yl; benzimidazole-1-yl; quinolin-2-yl; and isoquinolin-1-yl.

The term "halogen atom" means a fluoro (F), chloro (Cl), bromo (Br), or iodo (I) radical. Preferably, halogen atom is fluoro or chloro, more preferably fluoro.

Optionally two or more $R^A$ groups can combine together into one or more ring structures, with such ring structures having from 3 to 50 atoms in each ring structure excluding any hydrogen atoms. All individual values and subranges from 3 to 50 atoms in the ring structure are included and disclosed herein; for example, the number of atoms in the ring structure, when present, can range from a lower limit of 3, 10, 20, 30 or 40 to an upper limit of 5, 15, 25, 35, 45 or 50 atoms. For example, the number of atoms in the ring structure can range from 3 to 50, or in the alternative, from 3 to 25, or in the alternative, from 25 to 50, or in the alternative, from 20 to 30.

In the catalyst structure, Z is $[(R^D)_nG]_m$, wherein m=1, 2, 3, or 4, and G is independently selected from carbon, silicon, germanium or boron; and when G is carbon, silicon, or germanium, n=2; when G is boron, n=1 and wherein $R^D$ is $(C_1-C_{30})$hydrocarbyl or $(C_1-C_{30})$heterohydrocarbyl, as defined herein.

In the catalyst structure, Y is bonded to M and Z and is selected from the group consisting of —O—, —S—, —NR$^E$—, and —PR$^E$, wherein $R^E$ is $(C_1-C_{30})$hydrocarbyl or $(C_1-C_{30})$heterohydrocarbyl, as defined herein.

In the catalyst structure, X is $(C_1-C_{40})$hydrocarbyl (as defined herein); $(C_1-C_{40})$heterohydrocarbyl (as defined herein); $Si(R^C)_3$; $Ge(R^C)_3$; $P(R^C)_2$; $N(R^C)_2$; $OR^C$; $SR^C$; CN; $CF_3$, $R^CS(O)$—; $R^CS(O)_2$—; $(R^C)_2C=N$—; $R^CC(O)O$—; $R^COC(O)$—; $R^CC(O)N(R)$—; $(R^C)_2NC(O)$—; halogen atom; or hydrogen atom, wherein each $R^C$ independently is $(C_1-C_{30})$hydrocarbyl or $(C_1-C_{30})$heterohydrocarbyl, as defined herein.

In the catalyst structure, each of the hydrocarbyl, heterohydrocarbyl, $Si(R^C)_3$, $Ge(R^C)_3$, $P(R^C)_2$, $N(R^C)_2$, $OR^C$, $SR^C$, $R^CS(O)$—, $R^CS(O)_2$—, $(R^C)_2C=N$—, $R^CC(O)O$—, $R^COC(O)$—, $R^CC(O)N(R)$—, $(R^C)_2NC(O)$—, hydrocarbylene, and heterohydrocarbylene groups independently is unsubstituted or substituted with one or more $R^S$ substituents, wherein each $R^S$ independently is a halogen atom; polyfluoro substitution; perfluoro substitution; unsubstituted $(C_1-C_{18})$ alkyl; $F_3C$—; $FCH_2O$—; $F_2HCO$—; $F_3CO$—; $R_3Si$—; $R_3Ge$—; RO—; RS—; RS(O)—; $RS(O)_2$—; $R_2P$—; $R_2N$—; $R_2C=N$—; NC—; RC(O)O—; ROC(O)—; RC(O)N(R)—; or $R_2NC(O)$—; or two of the $R^S$ are taken together to form an unsubstituted $(C_1-C_{18})$alkylene, wherein each R independently is an unsubstituted $(C_1-C_{18})$alkyl.

In the catalyst structure, optionally, $R^C$ or $R^S$ may have an additional interaction with M. The additional interaction may be a dative bond, metal-pi interaction, or an agostic bond.

In the process disclosed herein, no activation agent is required to initiate polymerization.

The disclosure further provides the process according to any embodiment described herein, except that X is $(C_1-C_{40})$ hydrocarbyl, $(C_1-C_{40})$heterohydrocarbyl, $Si(R^C)_3$, or a hydrido group.

The disclosure further provides the process according to any embodiment described herein, except that X is a substituted benzyl or heteroarylbenzyl.

The disclosure further provides the process according to any embodiment described herein, except that X is selected from the group consisting of

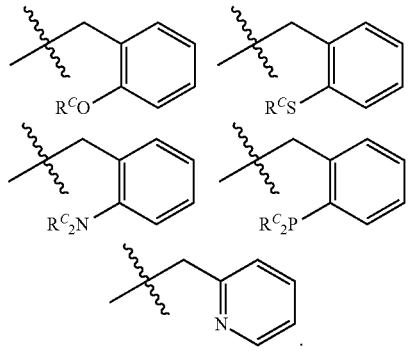

The disclosure further provides the process according to any embodiment described herein, except that the one or more olefinic monomers comprises ethylene.

The disclosure further provides the process according to any embodiment described herein, except that the one or more olefinic monomers comprises a linear α-olefin.

The disclosure further provides the process according to any embodiment described herein, except that the one or more olefinic monomers comprises 1-octene, 1-hexene, or 1-butene.

The disclosure further provides the process according to any embodiment described herein, except that one of the one or more olefinic monomers is a diene, such as, but not exclusively, decadiene, octadiene, hexadiene, butadiene, isoprene.

The disclosure further provides the process according to any embodiment described herein, except that the one or more catalysts comprise one or more of the following:
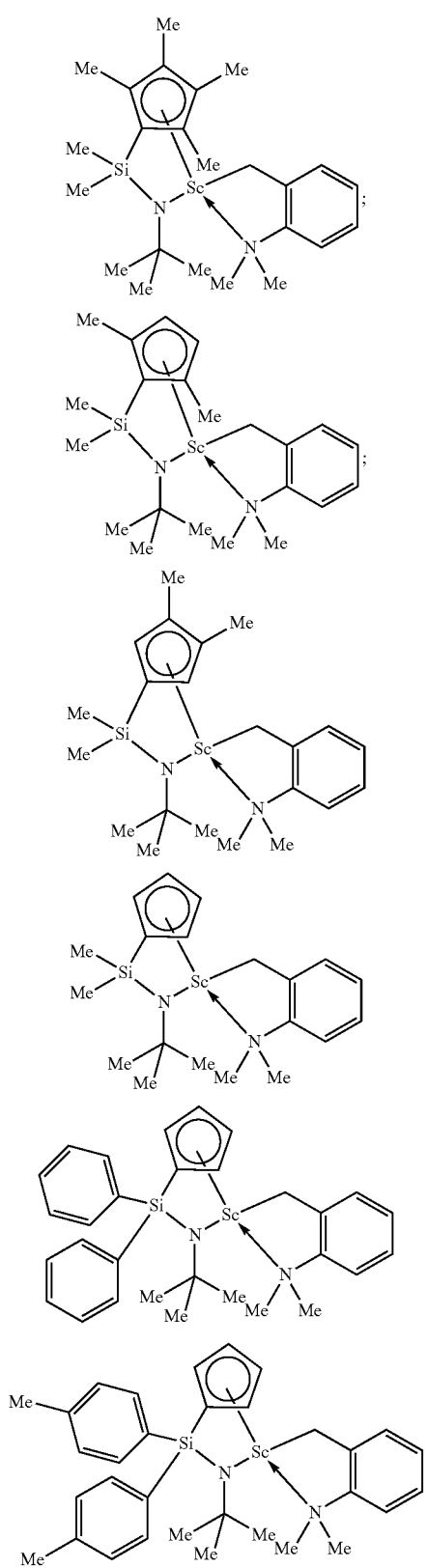
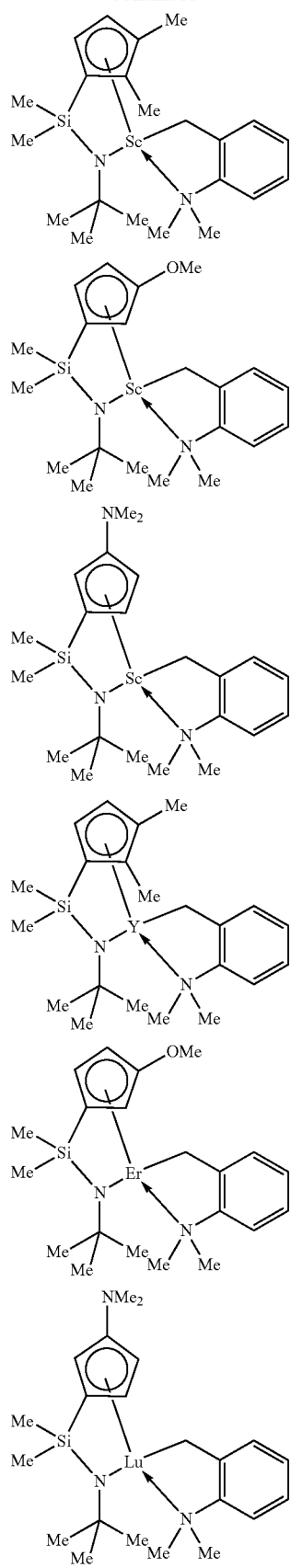

-continued
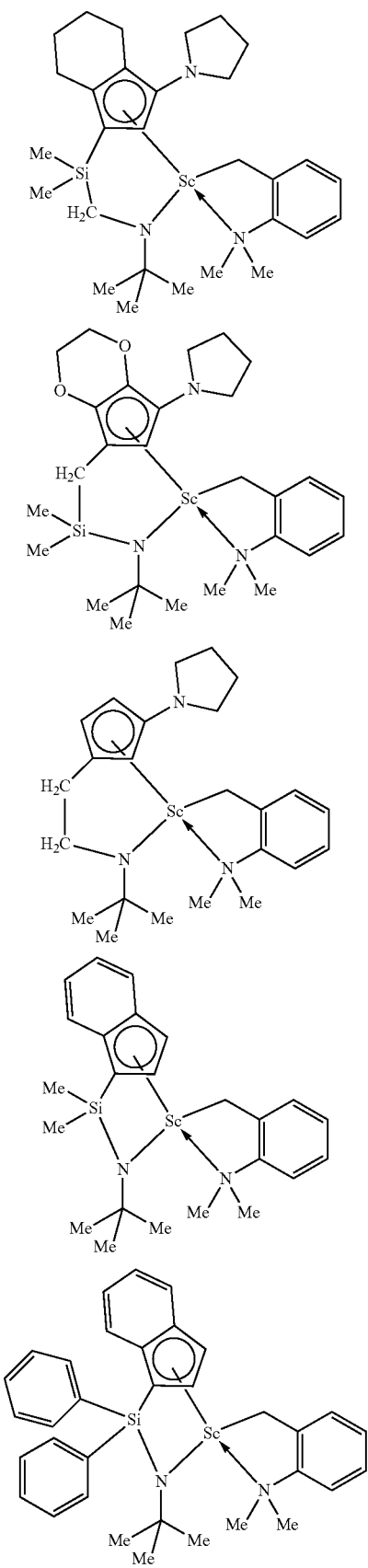
-continued
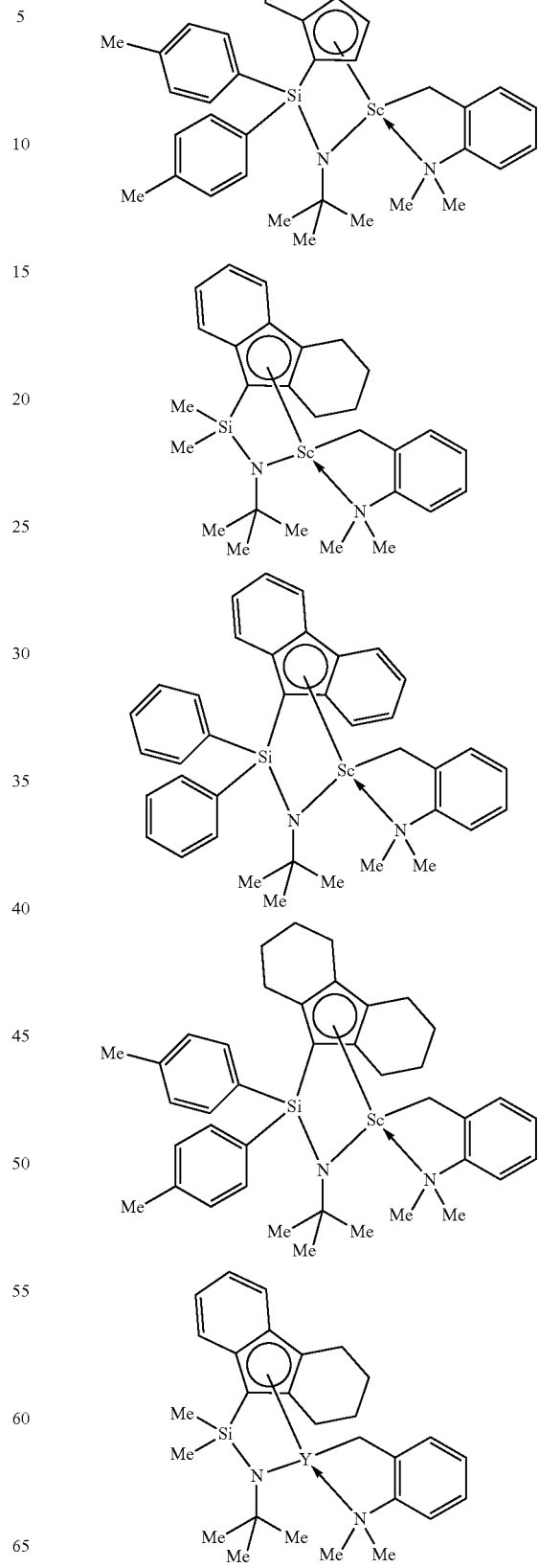

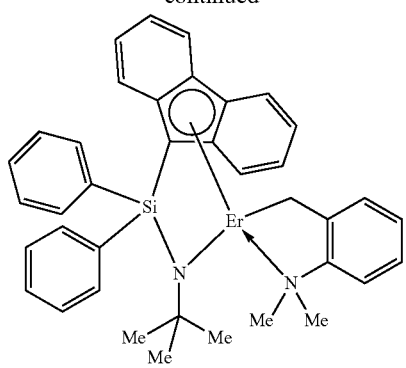
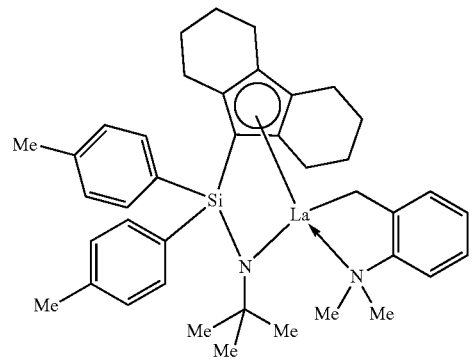
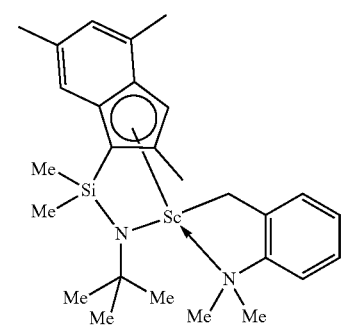
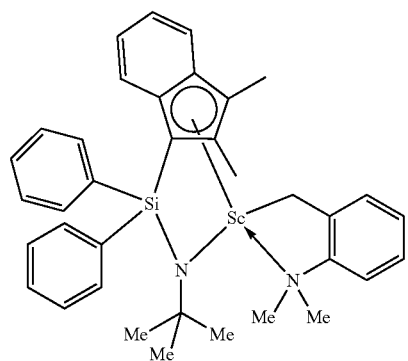
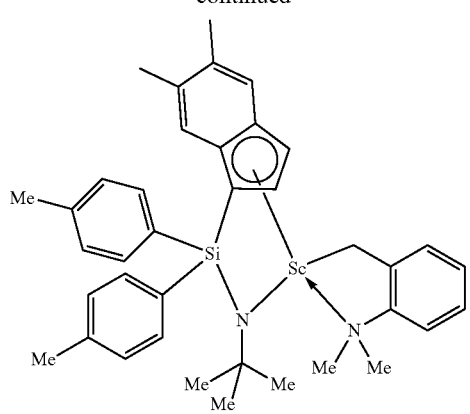
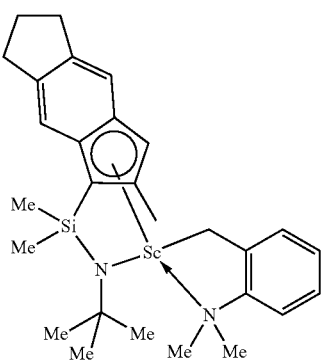
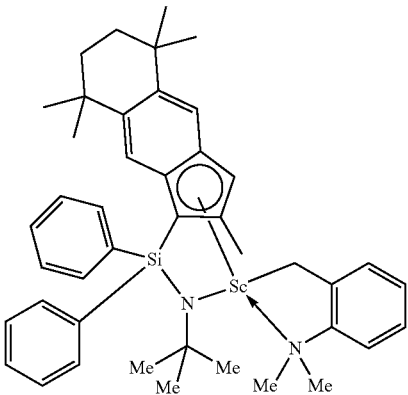
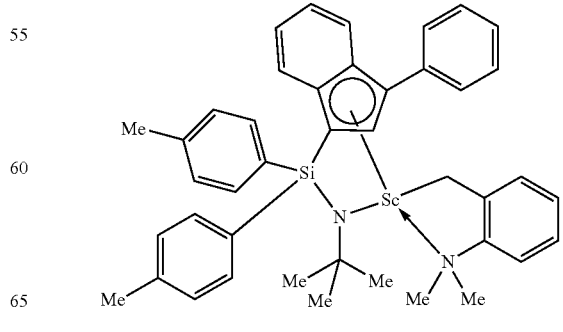

-continued
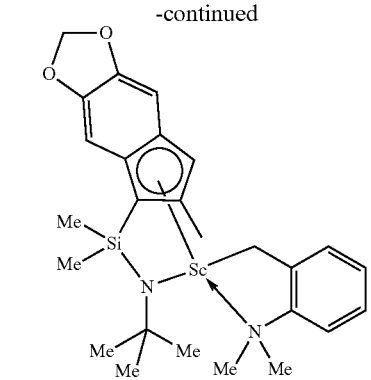
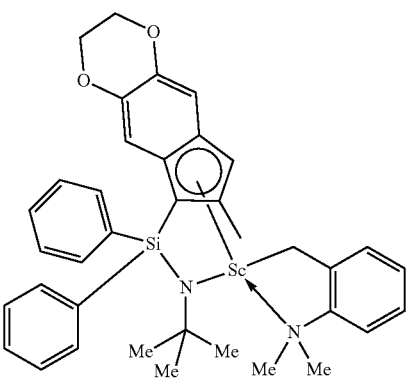
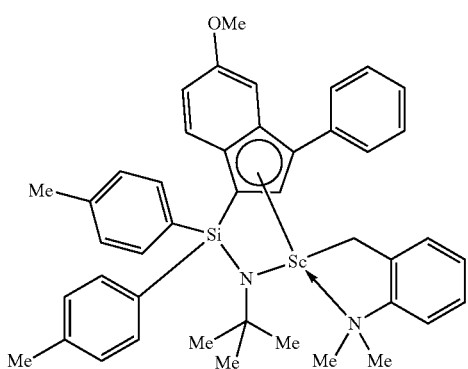
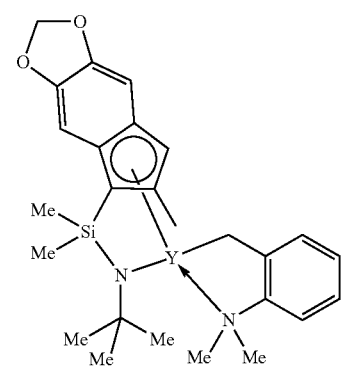
-continued
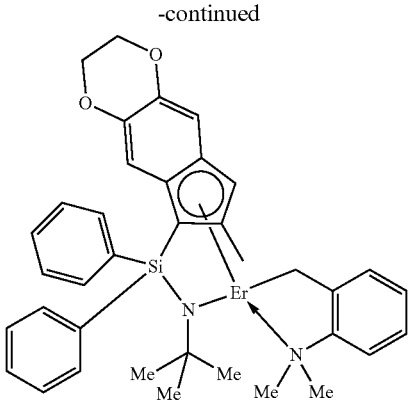
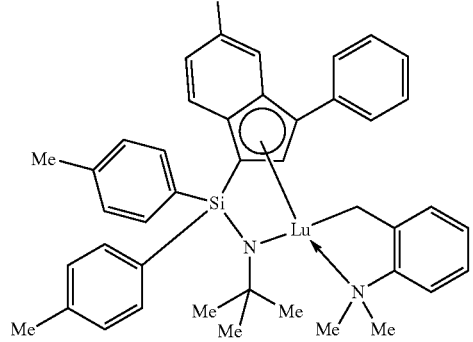
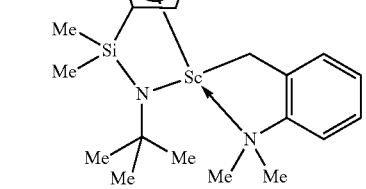
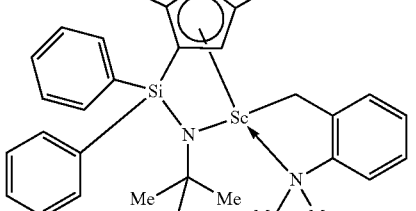

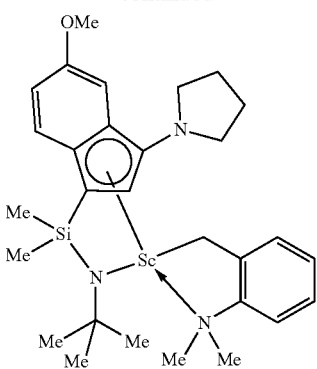
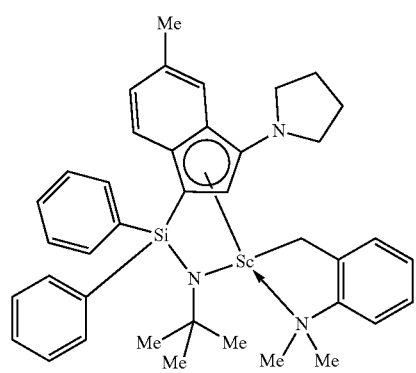
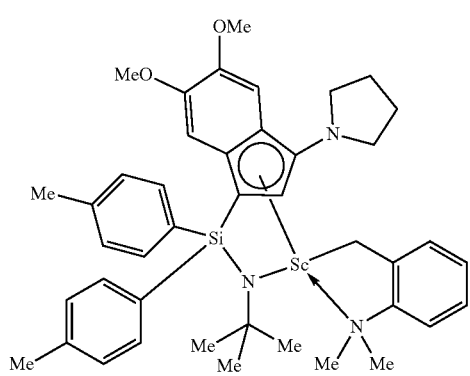
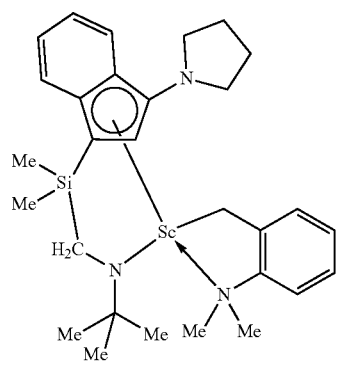
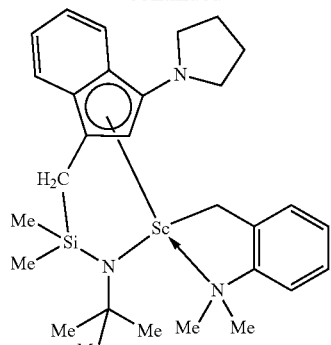
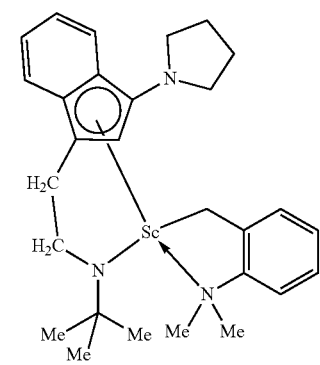
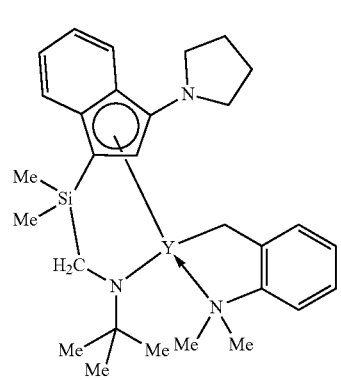
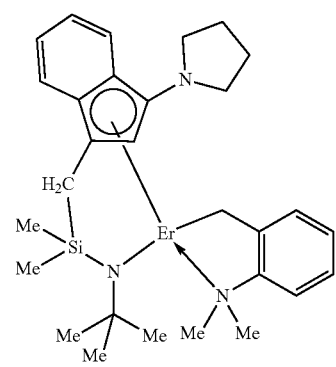

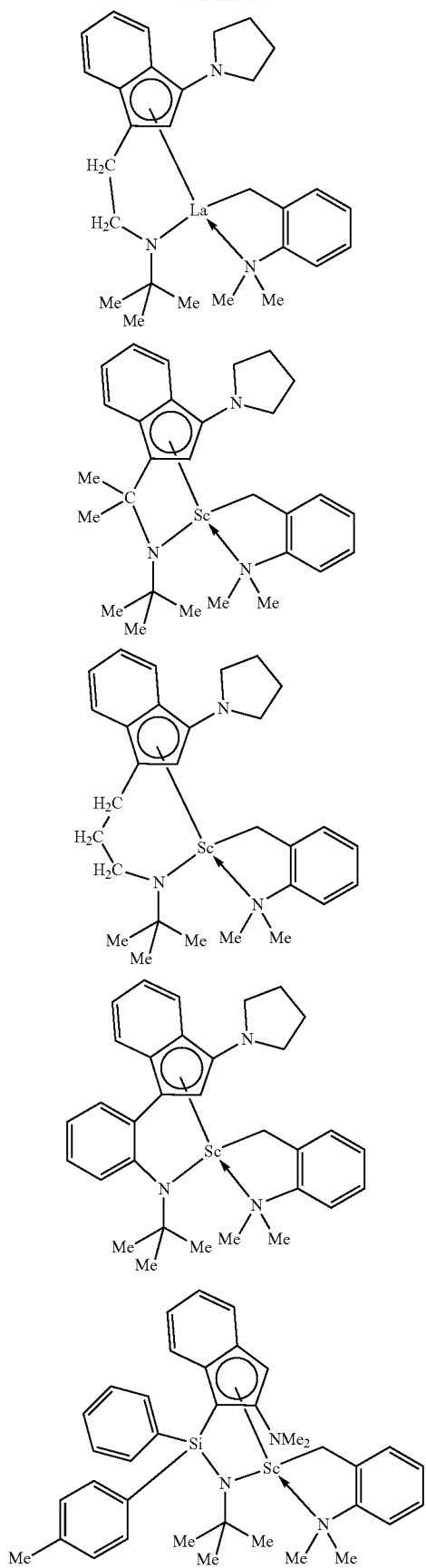
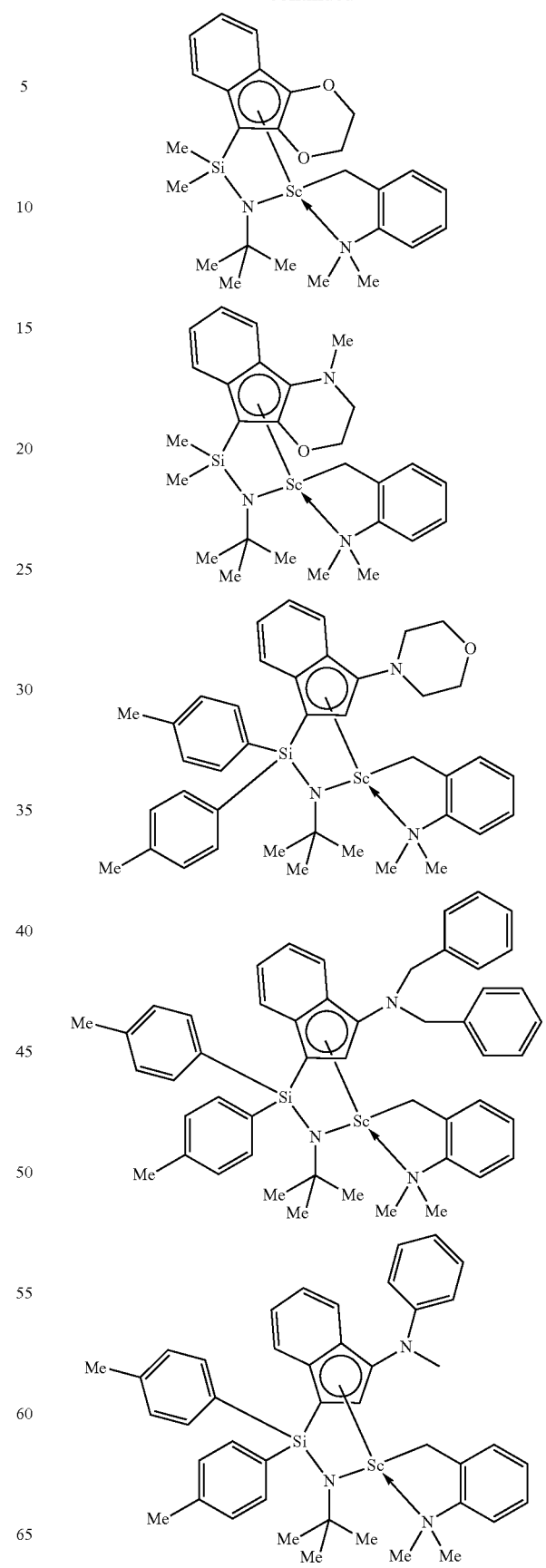

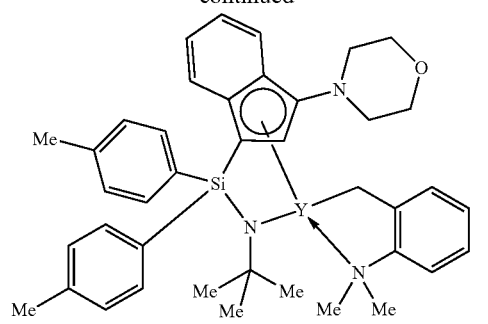
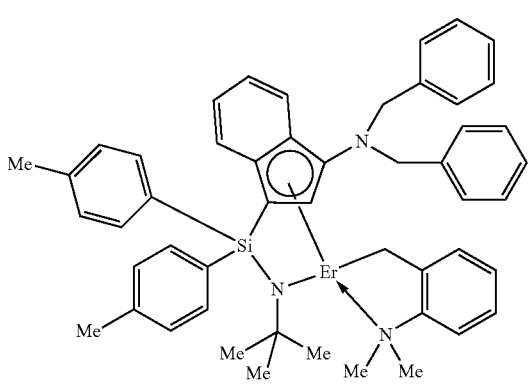
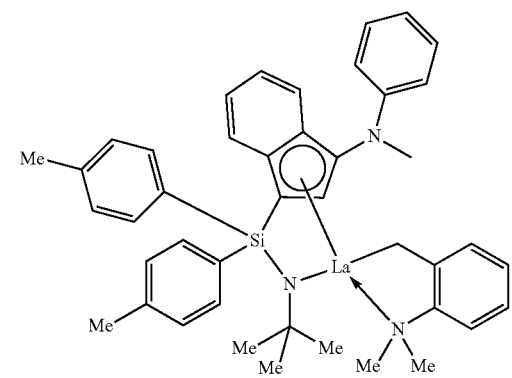
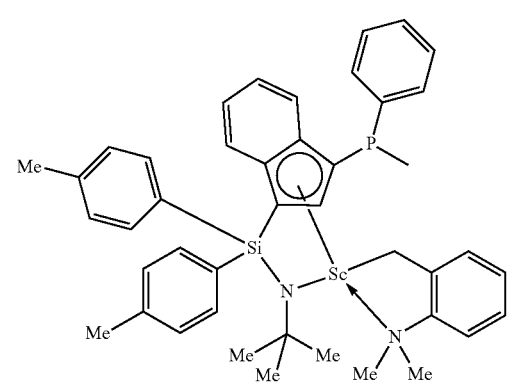
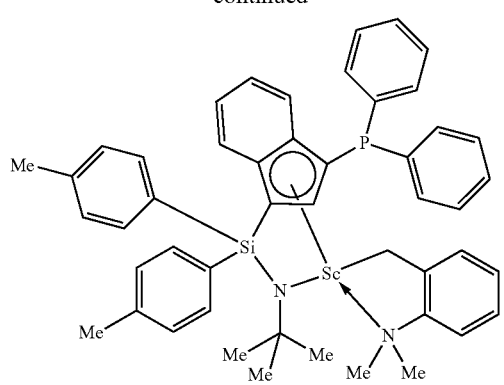
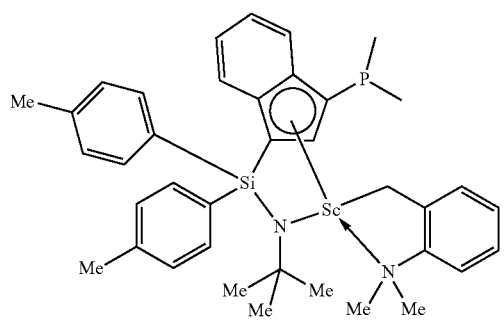
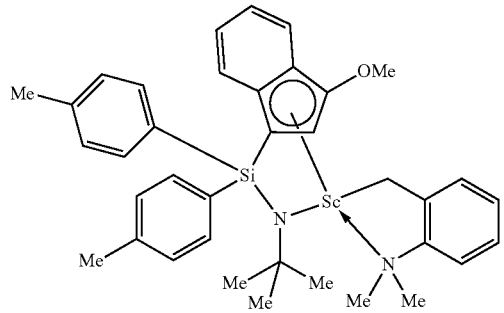
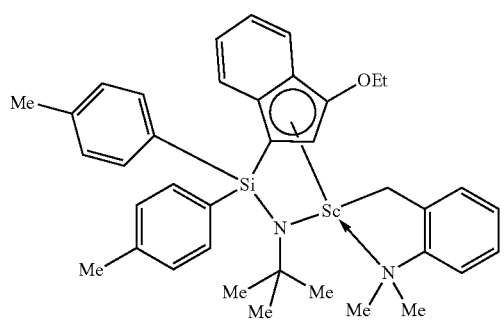
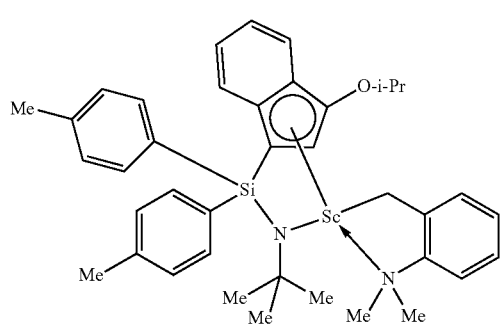

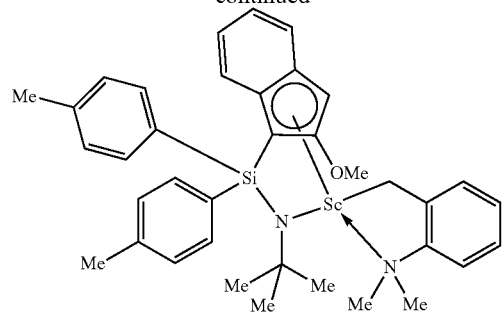
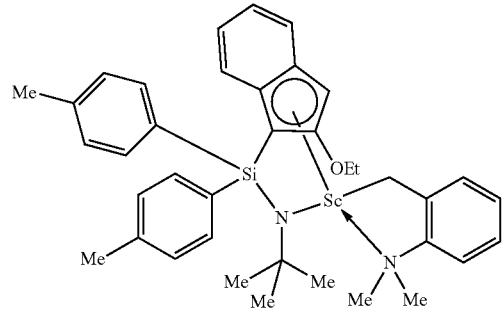
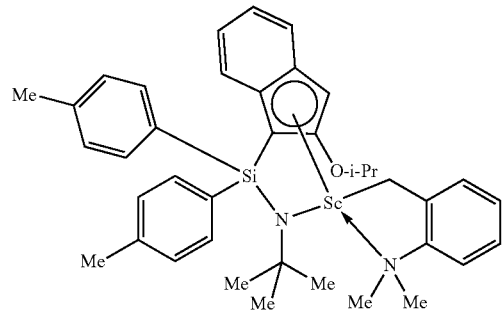
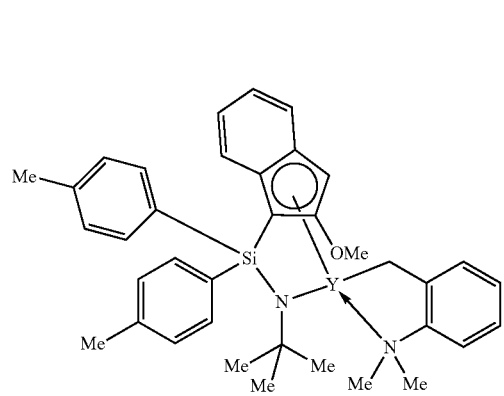
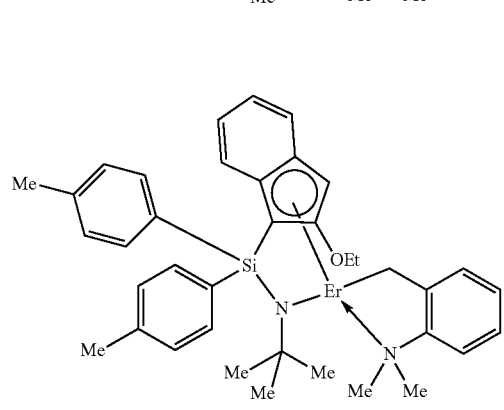
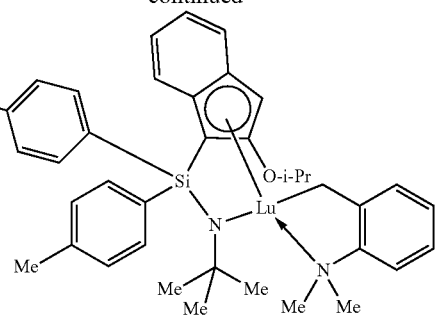
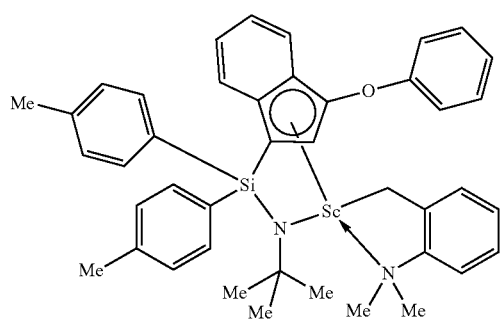
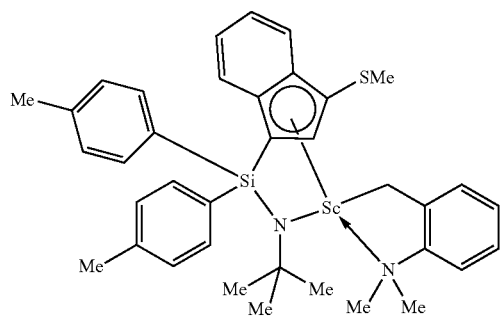
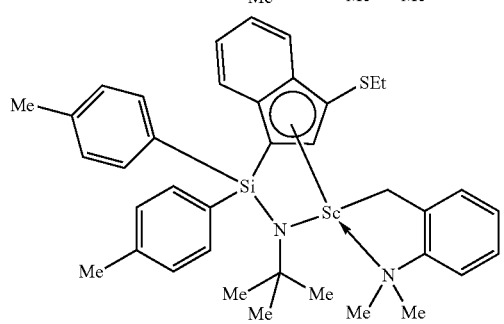
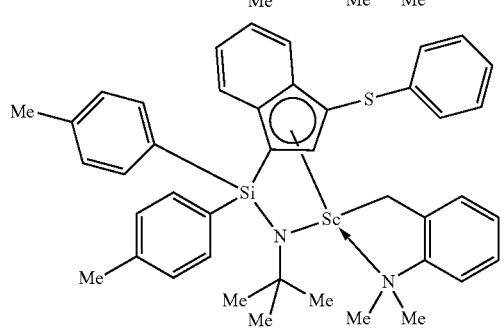

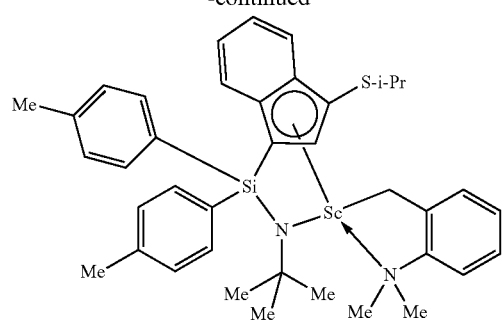
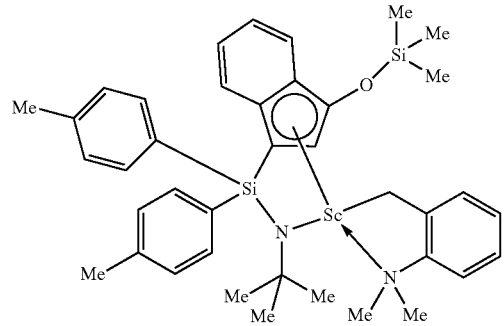
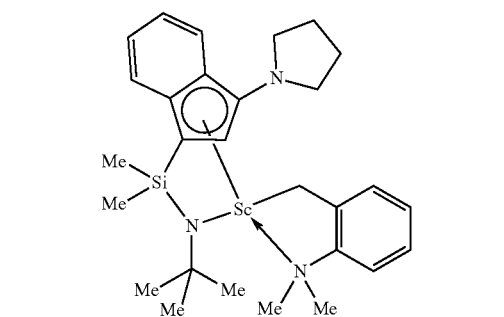
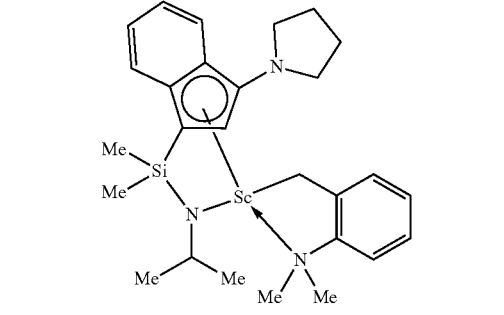
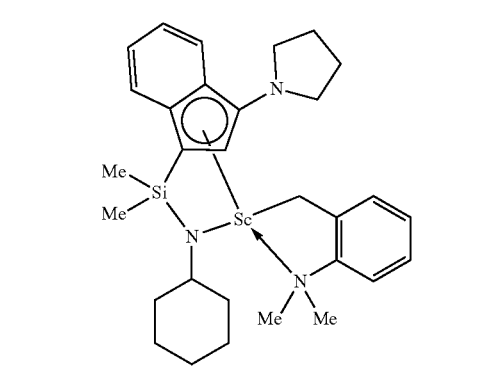
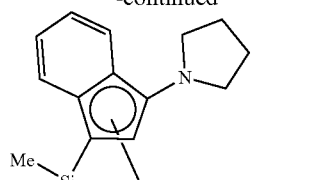
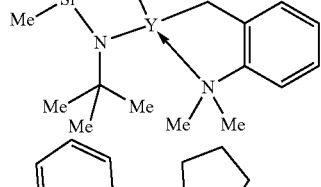
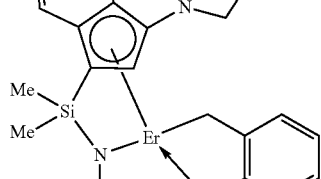
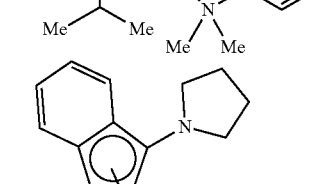
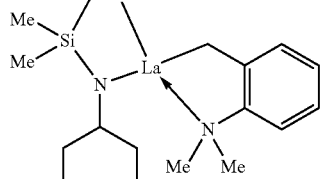
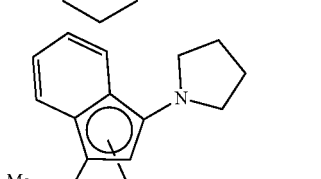
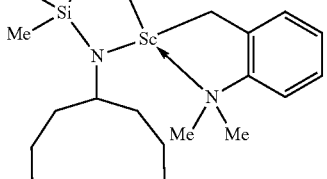
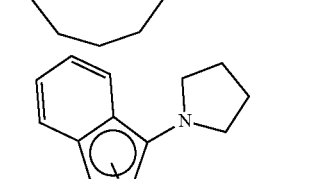
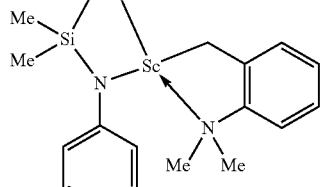

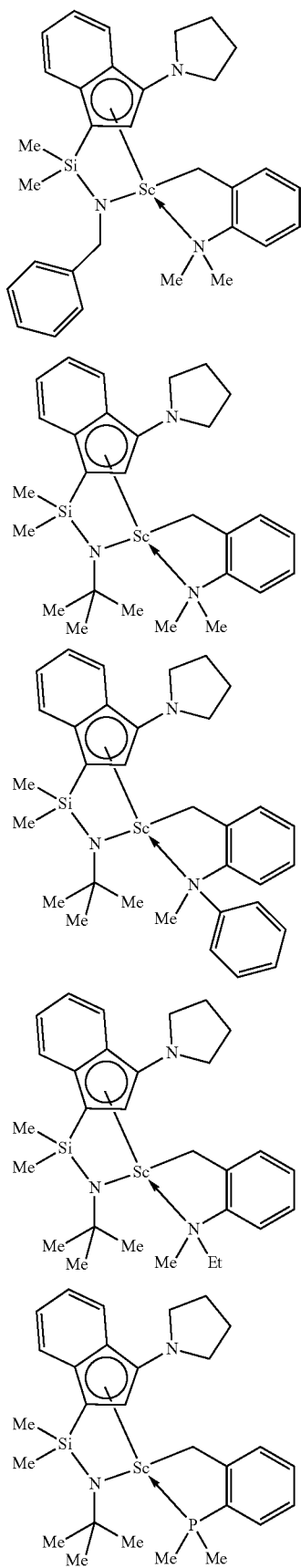
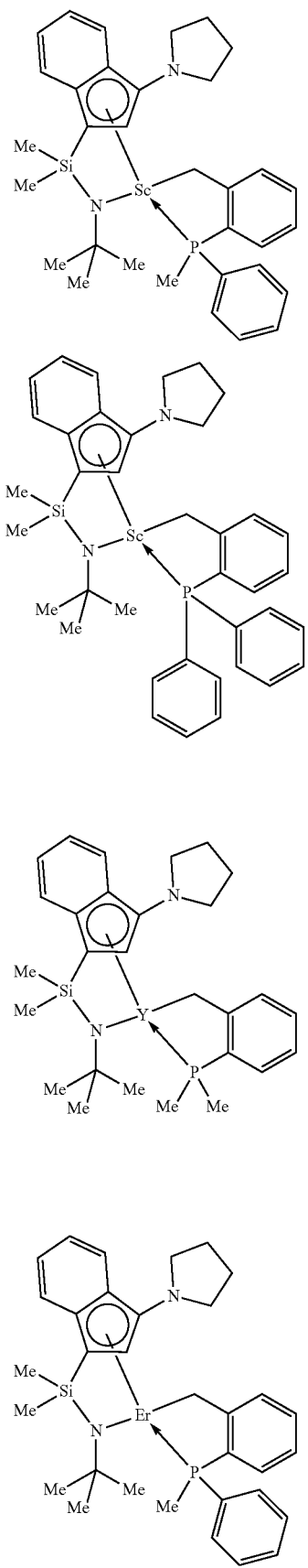

-continued
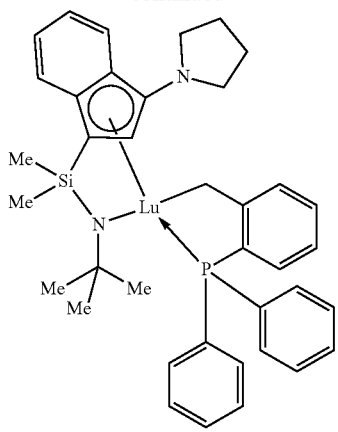
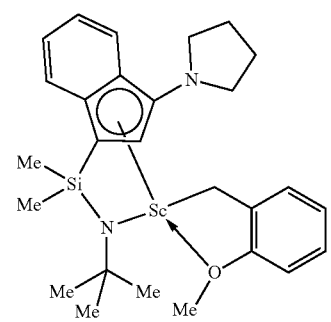
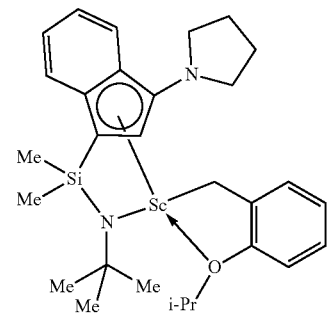
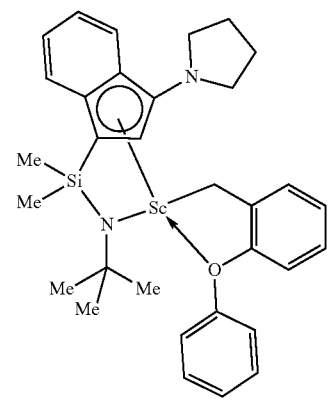
-continued
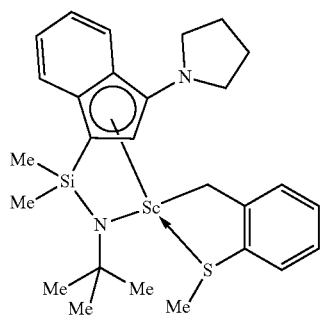
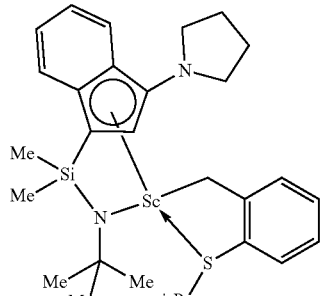
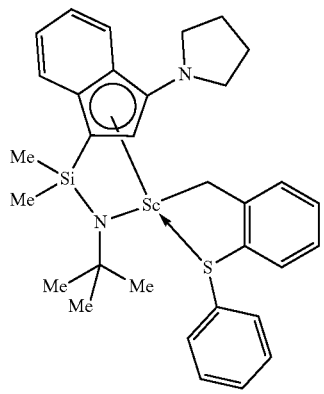
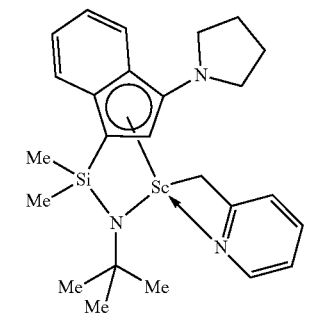
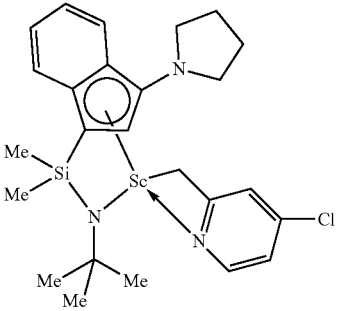

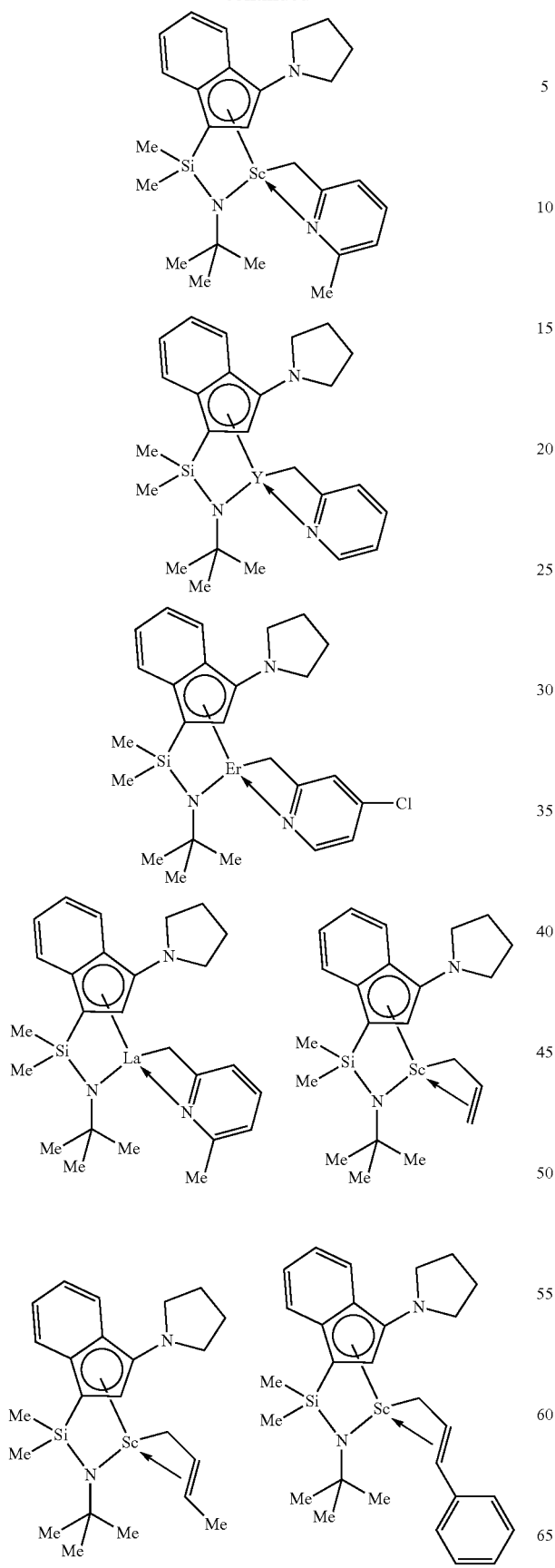
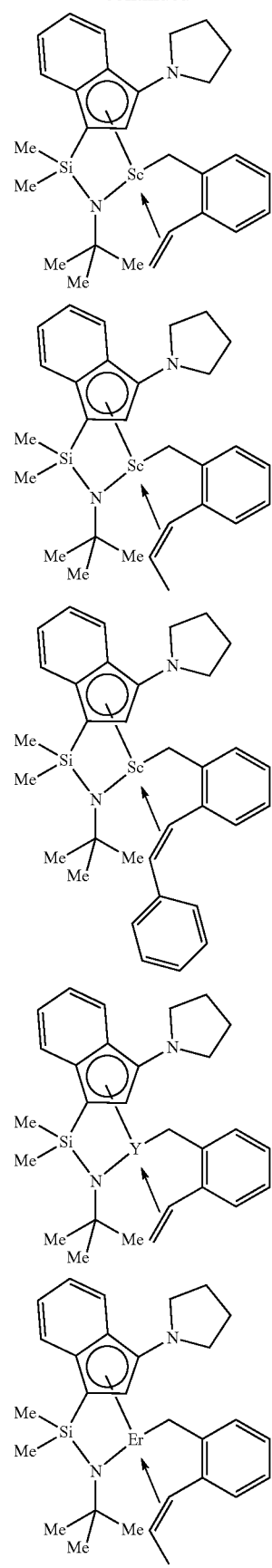

33
-continued
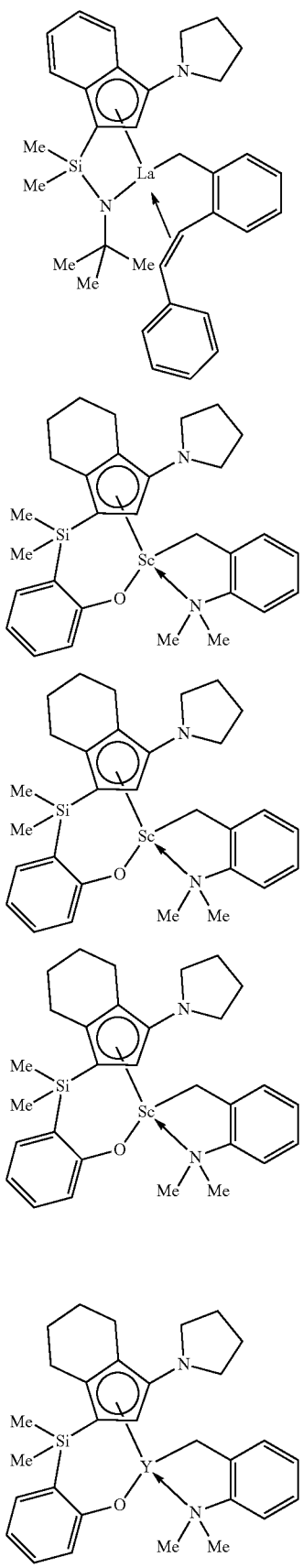
34
-continued
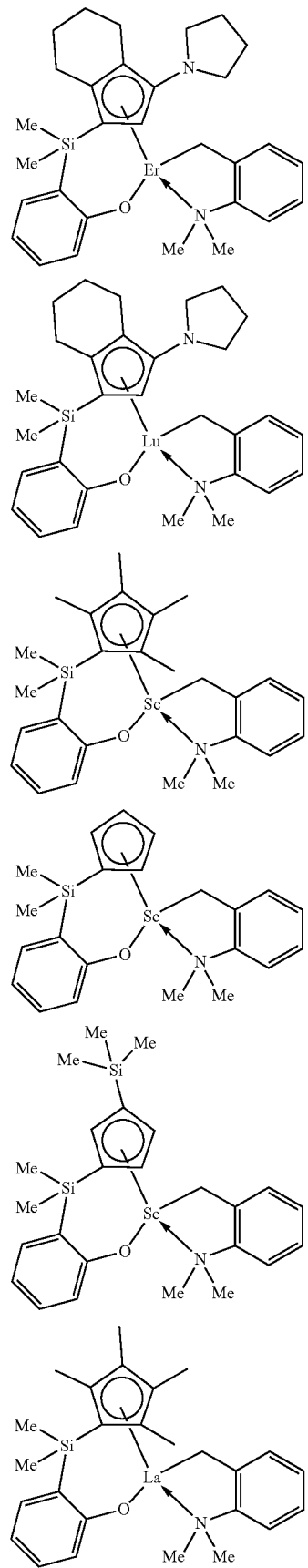

-continued

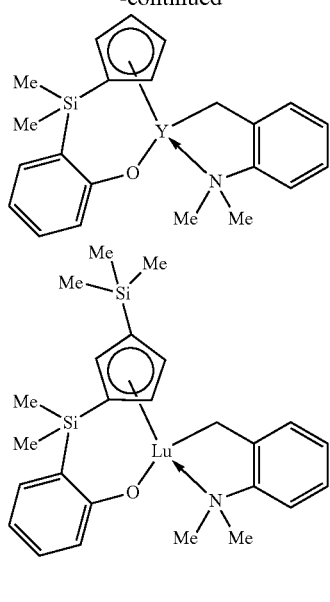

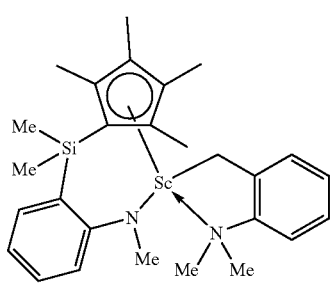

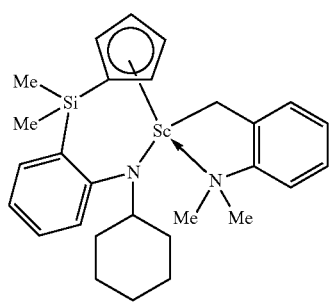

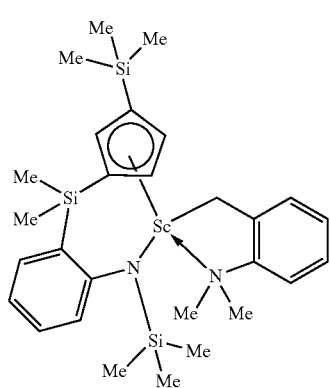

-continued

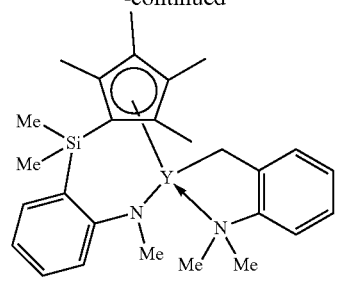

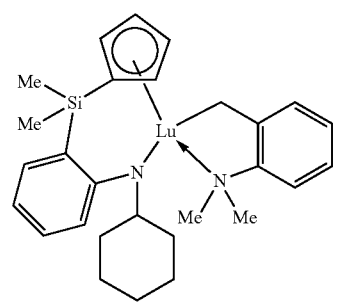

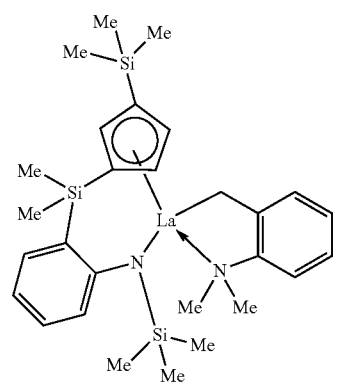

The disclosure further provides the process according to any embodiment described herein, except that the process is conducted in one or more polymerization process selected from the group consisting of solution phase polymerization process, gas phase polymerization process, and slurry phase polymerization. In the case of gas and slurry phase processes the catalyst structures described here can be used on a solid phase support, such as silica, alumina, or a polymer may be employed. Methods for the preparation of supported catalysts are disclosed in numerous references, examples of which are U.S. Pat. Nos. 4,808,561, 4,912,075, 5,008,228, 4,914,253, and 5,086,025, the disclosures of which are incorporated herein by reference.

The disclosure further provides the process according to any embodiment described herein, except that the process is conducted in more than one reactor connected in series or parallel.

In an alternative embodiment, the instant invention provides a process for producing a polyolefin in accordance with any of the preceding embodiments, except that the one or more Group III metal/Lanthanide based catalysts comprises:

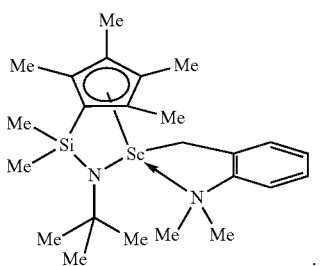

In an alternative embodiment, the instant invention provides a process for producing a polyolefin in accordance with any of the preceding embodiments, except that the one or more Group III metal/Lanthanide based catalysts comprises

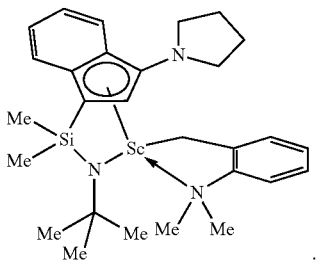

In an alternative embodiment, the instant invention provides a process for producing a polyolefin in accordance with any of the preceding embodiments, except that the one or more Group III metal/Lanthanide based catalysts comprises

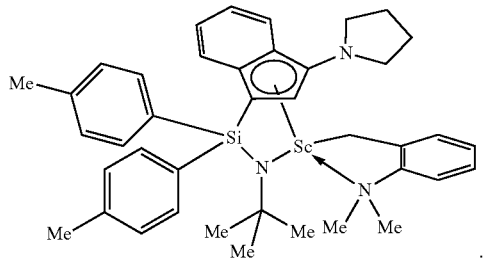

The Group III metal/Lanthanide based catalyst systems according to the present invention polymerize the one or more olefinic monomers in their neutral state and do not require dihydrogen or any other activator. The ability to conduct the reactions under dihydrogen-free conditions allows the production of polyolefins having a significantly higher molecular weight relative to a polymerization process in the presence of dihydrogen.

The one or more Group III metal/Lanthanide based catalysts, as described above, are catalytically active in their neutral (uncharged) state, and do not require the activators, for example, modified methyl aluminoxane (MMAO), triethyl aluminum (TEA), tris(pentafluorophenyl)borane (FAB), bis(hydrogenated tallow alkyl)methyl ammonium tetrakis(pentafluorophenyl)borate ([($C_{18}H_{37}$)$_2$MeNH]$^+$ [($C_6F_5$)B]$^-$), dihydrogen, and any combinations thereof, to be rendered active.

Polyolefin Compositions Produced Via the Inventive Process

The polyolefin compositions produced via the process according to the present invention comprises the reaction product of one or more olefinic monomers in the presence of one or more Group III metal/Lanthanide based catalyst systems, as described above, under polymerization conditions, wherein the polyolefin composition exhibits a molecular weight, Mw, equal to or greater than 5,000 g/mole and a molecular weight ratio, $M_w/M_n$, of greater than or equal to 2, and wherein the one or more Group III metal/Lanthanide based catalyst systems exhibit an efficiency of greater than or equal to 10,000 g of polyolefin per gram of metal in the catalyst.

The polyolefin composition according to the present invention can, for example, be an ethylene based polymer, for example homopolymers and/or interpolymers (including copolymers) of ethylene and optionally one or more comonomers such as α-olefins. Such ethylene based polymers can have a density in the range of 0.850 to 0.973 g/cm$^3$. All individual values and subranges from 0.850 to 0.973 g/cm$^3$ are included herein and disclosed herein; for example, the density can be from a lower limit of 0.850, 0.880, 0.885, 0.900, 0.905, 0.910, 0.915, or 0.920 g/cm$^3$ to an upper limit of 0.973, 0.963, 0.960, 0.955, 0.950, 0.925, 0.920, 0.915, 0.910, or 0.905 g/cm$^3$.

In one embodiment, such ethylene based polymers can have a molecular weight distribution ($M_w/M_n$) (measured according to the conventional GPC method) in the range of from greater than or equal to 2.0. All individual values and subranges from greater than or equal to 2 are included herein and disclosed herein; for example, the ethylene/α-olefin interpolymer may have a molecular weight distribution ($M_w/M_n$) in the range of from 2 to 20; or in the alternative, the ethylene/α-olefin interpolymer may have a molecular weight distribution ($M_w/M_n$) in the range of from 2 to 5.

In one embodiment, such ethylene based polymers can have a molecular weight ($M_w$) in the range of from equal to or greater than 5,000 g/mole, for example, in the range of from 100,000 to 500,000 g/moles.

In one embodiment, such ethylene based polymers can have a melt index ($I_2$) in the range of 0.1 to 200 g/10 minutes. All individual values and subranges from 0.1 to 200 g/10 minutes are included herein and disclosed herein; for example, the melt index ($I_2$) can be from a lower limit of 0.1, 0.2, 0.5, 0.6, 0.8, 1, 1.5, 2.0, 2.5, 3.0, 3.5, 4.0, 4.5, 5.0, 10, 15, 20, 30, 40, 50, 60, 80, 90, 100, or 150 g/10 minutes, to an upper limit of 0.9, 1, 1.5, 2.0, 2.5, 3.0, 3.5, 4.0, 4.5, 5.0, 10, 15, 20, 30, 40, 50, 60, 80, 90, 100, 150, or 200 g/10 minutes.

In one embodiment, such ethylene based polymers can have a melt flow ratio ($I_{10}/I_2$) in the range of from 5 to 30. All individual values and subranges from 5 to 30 are included herein and disclosed herein; for example, the melt flow ratio ($I_{10}/I_2$) can be from a lower limit of 5, 5.5, 6, 6.5, 8, 10, 12, 15, 20, or 25 to an upper limit of 5.5, 6, 6.5, 8, 10, 12, 15, 20, 25, or 30.

In one embodiment, the ethylene based polymers may further comprise at least 0.01 parts by weight of metal residues and/or metal oxide residues remaining from the one or more Group III metal/Lanthanide based catalyst systems per one million parts of the ethylene based polymers. The metal residues and/or metal oxide residues remaining from the one or more Group III metal/Lanthanide based catalyst systems in the ethylene based polymers may be measured by x-ray fluorescence (XRF), which is calibrated to reference standards.

The ethylene based polymers may comprise less than 40 percent by weight of units derived from one or more α-olefin comonomers. All individual values and subranges from less than 25 weight percent are included herein and disclosed herein; for example, the ethylene based polymers may comprise from less than 15 percent by weight of units derived from one or more α-olefin comonomers; or in the alternative, less than 10 percent by weight of units derived from one or more α-olefin comonomers; or in the alternative, from 1 to 40 percent by weight of units derived from one or more α-olefin comonomers; or in the alternative, from 1 to 10 percent by weight of units derived from one or more α-olefin comonomers.

The α-olefin comonomers typically have no more than 20 carbon atoms. For example, the α-olefin comonomers may preferably have 3 to 10 carbon atoms, and more preferably 3 to 8 carbon atoms. Exemplary α-olefin comonomers include, but are not limited to, propylene, 1-butene, 1-pentene, 1-hexene, 1-heptene, 1-octene, 1-nonene, 1-decene, and 4-methyl-1-pentene. The one or more α-olefin comonomers may, for example, be selected from the group consisting of propylene, 1-butene, 1-hexene, and 1-octene; or in the alternative, from the group consisting of 1-hexene and 1-octene.

The ethylene based polymers may comprise at least 60 percent by weight of units derived from ethylene. All individual values and subranges from at least 60 weight percent are included herein and disclosed herein; for example, the ethylene based polymers may comprise at least 75 percent by weight of units derived from ethylene; or in the alternative, at least 85 percent by weight of units derived from ethylene; or in the alternative, at least 90 percent by weight of units derived from ethylene; or in the alternative, from 80 to 100 percent by weight of units derived from ethylene; or in the alternative, from 90 to 100 percent by weight of units derived from ethylene.

Polymerization Process According to the Present Invention

The polymerization processes according to the present invention include, but are not limited to, solution polymerization process, particle forming polymerization process, and combinations thereof using one or more conventional reactors e.g. loop reactors, isothermal reactors, fluidized bed reactors, stirred tank reactors, batch reactors in parallel, series, and/or any combinations thereof.

In one embodiment, the polyolefin composition according to the present invention may, for example, be produced via solution-phase polymerization process using one or more loop reactors, isothermal reactors, and combinations thereof.

In general, the solution phase polymerization process occurs in one or more well-stirred reactors such as one or more loop reactors or one or more spherical isothermal reactors at a temperature in the range of from 30 to 300° C.; for example, from 120 to 215° C., and at pressures in the range of from 300 to 1500 psi; for example, from 400 to 750 psi. The residence time in solution phase polymerization process is typically in the range of from 2 to 30 minutes; for example, from 10 to 20 minutes. Ethylene, one or more solvents, one or more Group III metal/Lanthanide based catalyst systems, and optionally one or more comonomers are fed continuously to the one or more reactors, in the absence of any activator. Exemplary solvents include, but are not limited to, isoparaffins. For example, such solvents are commercially available under the name ISOPAR E from ExxonMobil Chemical Co., Houston, Tex. The resultant mixture of the ethylene based polymer and solvent is then removed from the reactor and the ethylene based polymer is isolated. Solvent is typically recovered via a solvent recovery unit, i.e. heat exchangers and vapor liquid separator drum, and is then recycled back into the polymerization system.

In one embodiment, the ethylene based polymer may be produced via solution polymerization in a single reactor system, for example a dual loop reactor system, wherein ethylene and optionally one or more α-olefins are polymerized in the presence of one or more Group III metal/Lanthanide based catalyst systems, as described herein, and in the absence of any activator. In one embodiment, the ethylene based polymer may be produced via solution polymerization in a dual reactor system, for example a dual loop reactor system, wherein ethylene and optionally one or more α-olefins are polymerized in the presence of one or more Group III metal/Lanthanide based catalyst systems in the absence of any activator. In one embodiment, the ethylene based polymer may be produced via solution polymerization in a dual reactor system, for example a dual loop reactor system, wherein ethylene and optionally one or more α-olefins are polymerized in the presence of the one or more Group III metal/Lanthanide based catalyst systems, as described herein, in the absence of any activator in both reactors.

The ethylene based polymers may further comprise one or more additives. Such additives include, but are not limited to, antistatic agents, color enhancers, dyes, lubricants, pigments, primary antioxidants, secondary antioxidants, processing aids, UV stabilizers, and combinations thereof. The inventive ethylene based polymers may contain any amounts of additives. The ethylene based polymers may compromise from about 0 to about 10 percent by the combined weight of such additives, based on the weight of the ethylene based polymers and the one or more additives. The ethylene based polymers may further compromise fillers, which may include, but are not limited to, organic or inorganic fillers. Such fillers, e.g. calcium carbonate, talc, $Mg(OH)_2$, can be present in levels from about 0 to about 20, based on the weight of the inventive ethylene based polymers and the one or more additives and/or fillers. The ethylene based polymers may further be blended with one or more polymers to form a blend.

EXAMPLES

The following examples illustrate the present invention but are not intended to limit the scope of the invention.

1) Synthesis of the First Group III Metal/Lanthanide Based Catalyst System (Catalyst 2) Having the Following Formula:

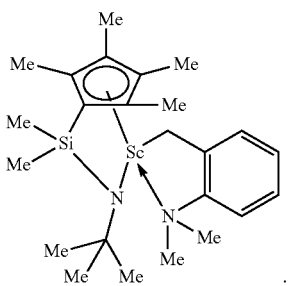

In a nitrogen-filled glovebox, a solution of a first ligand having the following formula: N-tert-butyl-1,1-dimethyl-1-

(2,3,4,5-tetramethylcyclopenta-2,4-dien-1-yl)silanamine (0.377 g, 1.5 mmol, 1 equiv.) in toluene (5 mL) was added dropwise to a solution of Sc(CH$_2$-o-NMe$_2$C$_6$H$_4$)$_3$ 1 (0.671 g, 1.5 mmol, 1 equiv.) in toluene (5 mL). The reaction was capped and stirred at 90° C. for 32 hours, after which <5% of first ligand remained. All volatiles were removed in vacuo, yielding a brown oil. Hexanes (40 mL) was layered onto the oil, and the mixture was cooled in a −30° C. freezer for 66 h, resulting in the precipitation of a solid. The solid was filtered, washed with cold hexanes, and dried in vacuo to yield a light tan solid (338 mg, 53% yield). $^1$H NMR (500 MHz, Benzene-d$_6$) δ 7.07 (ddd, J=7.7, 1.6, 0.6 Hz, 1H), 6.98 (td, J=7.5, 1.3 Hz, 1H), 6.75 (ddd, J=8.1, 7.3, 1.6 Hz, 1H), 6.55 (dd, J=8.0, 1.0 Hz, 2H), 2.22 (s, 3H), 2.17 (s, 3H), 2.04 (s, 3H), 1.96 (s, 3H), 1.85 (s, 3H), 1.55 (d, J=11.1 Hz, 1H), 1.49 (d, J=11.1 Hz, 1H), 1.32 (s, 3H), 1.13 (s, 9H), 0.80 (s, 3H), 0.69 (s, 3H). $^{13}$C NMR (126 MHz, Benzene-d$_6$) δ 143.21, 140.58, 131.07, 130.22, 128.00, 126.43, 125.14, 124.25, 121.33, 117.90, 108.84, 53.94, 45.64, 44.49 (br, benzyl CH$_2$), 44.39, 35.98, 13.83, 13.61, 11.26, 10.86, 7.87, 7.84.

2) Synthesis of the Second Group III Metal/Lanthanide Based Catalyst System (Catalyst 3) Having the Following Formula:

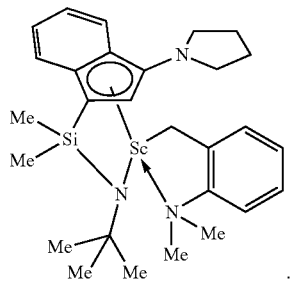

In a nitrogen-filled glovebox, a solution of a second ligand having the following formula: N-tert-butyl-1,1-dimethyl-1-(3-(pyrrolidin-1-yl)-1H-inden-1-yl)silanamine (0.211 g, 0.670 mmol, 1 equiv.) in toluene-d$^8$ (2.5 mL) was added dropwise to a solution of Sc(CH$_2$-o-NMe$_2$C$_6$H$_4$)$_3$ (0.300 g, 0.670 mmol, 1 equiv.) in toluene-d$^8$ (2.5 mL). The reaction was capped and stirred at 90° C. for 18 hours, resulting in a dark orange solution. All volatiles were removed in vacuo, yielding a dark orange oil. Hexanes (15 mL) was layered onto the oil, and the mixture was cooled in a −30° C. freezer for several days, resulting in the precipitation of a solid. The solid was filtered, washed with cold (−30° C.) hexanes (3×5 mL), and dried in vacuo to yield the product as a gold powder (0.144 mg, 44% yield). The product was a mixture of two isomers in equilibrium, with a ratio at ambient temperature of approximately 3:1. Major isomer: $^1$H NMR (400 MHz, Benzene-d$^6$) δ 7.78-7.73 (m, 1H), 7.60-7.55 (m, 1H), 7.07 (d, J=6.8 Hz, 1H), 6.98-6.92 (m, 1H), 6.77 (ddd, J=8.7, 6.5, 1.1 Hz, 1H), 6.72-6.65 (m, 2H), 6.48 (d, J=8.1 Hz, 1H), 6.11 (s, 1H), 3.37-3.25 (m, 4H), 1.93 (d, J=11.3 Hz, 1H), 1.76 (s, 3H), 1.76 (s, 3H), 1.68-1.61 (m, 4H), 1.14 (d, J=11.2 Hz, 1H), 0.85 (s, 9H), 0.85 (s, 3H), 0.80 (s, 3H). $^{13}$C NMR (101 MHz, Benzene-d$^6$) δ 144.50, 140.66, 140.54, 132.28, 131.18, 128.16, 124.36, 123.96, 121.78, 121.66, 121.31, 118.92, 118.54, 107.52, 92.77, 54.30, 50.82, 47.08, 44.02, 40.79, 35.26, 25.30, 5.99, 3.89. Minor isomer: $^1$H NMR (400 MHz, Benzene-d$_6$) δ 7.94-7.90 (m, 1H), 7.60- 7.56 (m, 1H), 7.09-7.05 (m, 1H), 6.97-6.92 (m, 2H), 6.91-6.86 (m, 1H), 6.72-6.64 (m, 1H), 6.59-6.54 (m, 1H), 5.74 (s, 1H), 3.04-2.79 (m, 4H), 2.31 (s, 3H), 2.17 (s, 3H), 1.50-1.39 (m, 4H), 1.12 (d, J=11.5 Hz, 1H), 0.94 (s, 3H), 0.92 (s, 9H), 0.72 (s, 3H), 0.35 (d, J=11.5 Hz, 1H). $^{13}$C NMR (101 MHz, Benzene-d$^6$) δ 144.90, 140.98, 138.75, 133.01, 131.41, 128.01, 124.92, 123.43, 122.59, 122.09, 121.22, 119.91, 118.00, 105.82, 93.39, 54.07, 51.08, 45.69, 43.73, 40.94, 35.37, 24.73, 5.18, 4.40. Anal. Calculated for C$_{28}$H$_{40}$N$_3$ScSi: C, 68.40; H, 8.20; N, 8.55. Found: C, 68.37; H, 8.30; N, 8.53.

3) Synthesis of the Third Group III Metal/Lanthanide Based Catalyst System (Catalyst 4) Having the Following Formula:

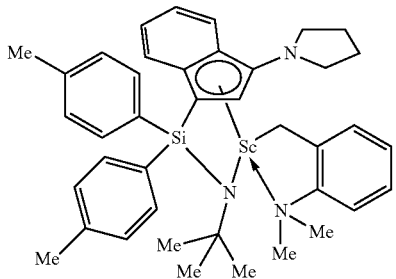

In a nitrogen-filled glovebox, a solution of a third ligand having the following formula: N-tert-butyl-1-(3-(pyrrolidin-1-yl)-1H-inden-1-yl)-1,1-di-p-tolylsilanamine (0.700 g, 1.5 mmol, 1 equiv.) in toluene (5 mL) was added dropwise to a solution of Sc(CH$_2$-o-NMe$_2$C$_6$H$_4$)$_3$ (0.671 g, 1.5 mmol, 1 equiv.) in toluene (5 mL). The reaction was capped and stirred at 90° C. for 18 hours. All volatiles were removed in vacuo, yielding a brown oil. Hexanes (40 mL) was layered onto the oil, and the mixture was cooled in a −30° C. freezer for 19 hours, resulting in the precipitation of a solid. The solid was filtered, washed with hexanes (3×10 mL), and dried in vacuo to yield a yellow powder (755 mg, 78% yield). The product was a mixture of two isomers in equilibrium, with a ratio at ambient temperature of approximately 4:1. Major isomer: $^1$H NMR (400 MHz, Benzene-d$_6$) δ 8.20 (d, J=6.6 Hz, 2H), 8.18 (d, J=6.5 Hz, 2H), 7.54-7.50 (m, 1H), 7.21 (d, J=7.5 Hz, 2H), 7.18 (d, J=7.5 Hz, 2H), 7.14 (d, J=7.6 Hz, 1H), 7.03-6.97 (m, 2H), 6.74 (t, J=7.6 Hz, 1H), 6.59-6.48 (m, 3H), 6.45 (s, 1H), 3.39-3.23 (m, 4H), 2.18 (s, 3H), 2.13 (s, 3H), 2.09 (d, J=11.4 Hz, 1H), 1.85 (s, 3H), 1.75 (s, 3H), 1.69-1.60 (m, 4H), 1.21 (d, J=11.3 Hz, 1H), 1.02 (s, 9H). $^{13}$C NMR (101 MHz, Benzene-d$_6$) δ 144.27, 141.62, 140.61, 138.24, 138.03, 137.65, 137.58, 136.59, 136.05, 133.11, 131.64, 128.60, 128.49, 128.25, 124.68, 123.72, 122.27, 121.97, 121.46, 119.23, 118.76, 108.75, 90.63, 54.08, 50.90, 47.29, 44.52 (br, benzyl CH$_2$), 40.89, 35.81, 25.32, 21.24, 21.12. Minor isomer: $^1$H NMR (400 MHz, Benzene-d$_6$) δ 8.36 (d, J=7.9 Hz, 2H), 8.11 (d, J=7.8 Hz, 1H), 7.99 (d, J=7.9 Hz, 2H), 7.73 (d, J=8.4 Hz, 1H), 7.58-7.54 (m, 1H), 7.24-7.17 (m, 4H), 7.08-7.04 (m, 1H), 6.95-6.87 (m, 3H), 6.63 (dd, J=8.1, 1.3 Hz, 1H), 5.65 (s, 1H), 2.94-2.70 (m, 4H), 2.39 (s, 3H), 2.34 (s, 3H), 2.16 (s, 3H), 2.15 (s, 3H), 1.39-1.33 (m, 4H), 1.20 (d, J=11.8 Hz, 1H), 1.11 (s, 9H), 0.41 (d, J=11.6 Hz, 1H). $^{13}$C NMR (101 MHz, Benzene-d$_6$) δ 144.78, 141.16, 139.56, 138.55, 137.88, 136.91, 136.46, 136.31, 136.00, 133.31, 131.73, 128.90, 128.58, 128.06, 125.20, 123.45, 122.79, 122.72, 121.49, 120.18, 118.05, 107.39, 91.82, 53.74, 51.01, 45.97, 44.82 (br, benzyl CH$_2$), 41.19, 35.97, 24.69, 21.16, 21.14. Anal. Calculated for C$_{40}$H$_{48}$N$_3$ScSi: C, 74.62; H, 7.51; N, 6.53. Found: C, 74.29; H, 7.34; N, 6.47.

4) Synthesis of the Fourth Group III Metal/Lanthanide Based Catalyst System (Catalyst 5) Having the Following Formula:

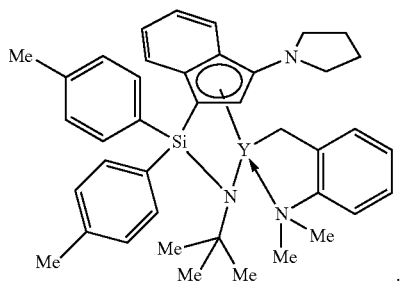

In a nitrogen-filled glovebox, a solution of a fourth ligand having the following formula: N-tert-butyl-1-(3-(pyrrolidin-1-yl)-1H-inden-1-yl)-1,1-di-p-tolylsilanamine (0.350 g, 0.75 mmol, 1 equiv.) in toluene-d$^8$ (2.5 mL) was added dropwise to a solution of Y(CH$_2$-o-NMe2-C$_6$H$_4$)$_3$ (0.369 g, 0.75 mmol, 1 equiv.) in toluene-d$^8$ (2.5 mL). The reaction vial was sealed with a teflon-lined cap and stirred at 90° C. for 23 hour. The vessel was allowed to cool to room temperature. All volatiles were removed in vacuo, yielding a thick brown oil. Pentane (15 mL) was added to the oil, and the mixture was vigorously stirred at room temperature for 4 hour, resulting in the precipitation of a fine yellow powder precipitated. Note that simple layering with pentane and storage in a freezer does not result in the precipitation of an appreciable amount of solids—vigorous stirring is necessary. The suspension was cooled in a –30° C. freezer for 18 hour. The solid was filtered, washed with pentane, and dried in vacuo to yield the product as a yellow solid (0.4 g, 78% yield). $^1$H NMR (400 MHz, Benzene-d$_6$) δ 8.28 (d, J=7.4 Hz, 2H), 8.06 (d, J=7.4 Hz, 2H), 7.50-7.46 (m, 1H), 7.32-7.27 (m, 1H), 7.21 (d, J=7.6 Hz, 2H), 7.17 (d, J=7.5 Hz, 2H), 7.14-7.06 (m, 1H), 6.93-6.87 (m, 1H), 6.59 (t, J=7.1 Hz, 1H), 6.55-6.51 (m, 2H), 6.46 (d, J=8.2 Hz, 1H), 6.30 (s, 1H), 3.20 (br s, 4H), 2.29 (d, J=9.0 Hz, 1H), 2.17 (s, 3H), 2.13 (s, 3H), 1.79 (s, 3H), 1.62 (s, 4H), 1.57 (s, 3H), 1.18 (d, J=9.8 Hz, 1H), 1.05 (s, 9H). $^{13}$C NMR (126 MHz, Benzene-d$_6$) δ 144.64, 138.93 (br), 138.70 (br), 138.22 (br), 137.96, 137.78, 136.56, 135.98, 134.74 (br), 133.30, 130.67, 128.60, 128.54, 128.33, 123.10 (br), 122.95 (br), 121.43 (br), 120.97, 120.42 (br), 120.01 (br), 118.26 (br), 108.91, 89.78, 52.62, 51.30, 44.86 (d, J=30.8 Hz), 43.97 (br), 39.98 (br), 36.28, 25.02, 21.23, 21.15. Anal. Calculated for C$_{40}$H$_{48}$N$_3$SiY: C, 69.85; H, 7.03; N, 6.11. Found: C, 69.46; H, 6.77; N, 6.01.

5) Synthesis of the Fifth Group III Metal/Lanthanide Based Catalyst System (Catalyst 6) Having the Following Formula:

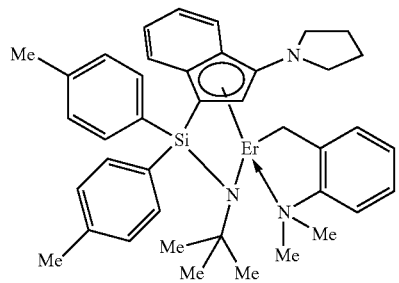

In a nitrogen-filled glovebox, a solution of a fifth ligand having the following formula: N-tert-butyl-1-(3-(pyrrolidin-1-yl)-1H-inden-1-yl)-1,1-di-p-tolylsilanamine (0.350 g, 0.75 mmol, 1 equiv.) in toluene-d$^8$ (2.5 mL) was added dropwise to a solution of Er(CH$_2$-o-NMe$_2$-C$_6$H$_4$)$_3$ (0.427 g, 0.75 mmol, 1 equiv.) in toluene-d$^8$ (2.5 mL). The reaction vial was sealed with a teflon-lined cap and stirred at 90° C. for 14 hours. The vessel was allowed to cool to room temperature. All volatiles were removed in vacuo, yielding a thick orange-brown oil. Pentane (15 mL) was added to the oil, and the mixture was vigorously stirred at room temperature for 4 hours, resulting in the precipitation of a fine yellow powder precipitated. Note that simple layering with pentane and storage in a freezer does not result in the precipitation of an appreciable amount of solids—vigorous stirring is necessary. The suspension was cooled in a –30° C. freezer for 18 hours. The solid was filtered, washed with pentane, and dried in vacuo to yield the product as a yellow solid (0.382 g, 67% yield). Er is paramagnetic, so no NMR analysis could be performed. Analysis Calculated for C$_{40}$H$_{48}$ErN3Si: C, 62.71; H, 6.31; N, 5.48. Found: C, 62.55; H, 6.21; N, 5.26.

6) Synthesis of the Third Group III Metal/Lanthanide Based Catalyst System (Catalyst 7) Having the Following Formula:

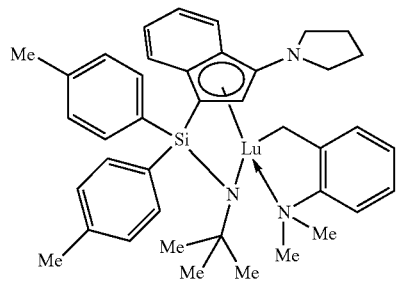

In a nitrogen-filled glovebox, a solution of a 6th ligand having the following formula: N -tert-butyl-1-(3-(pyrrolidin-1-yl)-1H-inden-1-yl)-1,1-di-p-tolylsilanamine (0.350 g, 0.75 mmol, 1 equiv.) in toluene-d$^8$ (2.5 mL) was added dropwise to a solution of Lu(CH$_2$-o-NMe$_2$-C$_6$H$_4$)$_3$ (0.433 g, 0.75 mmol, 1 equiv.) in toluene-d$^8$ (2.5 mL). The reaction vial was sealed with a teflon-lined cap and stirred at 90° C.

for 18 hours. The vessel was allowed to cool to room temperature. All volatiles were removed in vacuo, yielding an orange oil. Pentane (15 mL) was added to the oil, and the mixture was vigorously stirred at room temperature for 4 hours, resulting in the precipitation of a fine yellow powder precipitated. Note that simple layering with pentane and storage in a freezer does not result in the precipitation of an appreciable amount of solids—vigorous stirring is necessary. The suspension was cooled in a −30° C. freezer for 18 hours. The solid was filtered, washed with pentane, and dried in vacuo to yield the product as a yellow solid (0.420 g, 72% yield). $^1$H NMR (500 MHz, Benzene-d$_6$) δ 8.28 (d, J=7.5 Hz, 2H), 8.14 (d, J=7.4 Hz, 2H), 7.49 (d, J=8.3 Hz, 1H), 7.23 (d, J=7.5 Hz, 2H), 7.22-7.17 (m, 2H), 7.17-7.11 (m, 2H), 6.96 (t, J=7.5 Hz, 1H), 6.69 (t, J=7.6 Hz, 1H), 6.60-6.51 (m, 2H), 6.48 (d, J=8.2 Hz, 1H), 6.32 (s, 1H), 3.36-3.15 (m, 4H), 2.26-2.21 (m, 1H), 2.20 (s, 3H), 2.16 (s, 3H), 1.82 (s, 3H), 1.65 (s, 4H), 1.63 (s, 3H), 1.18-1.09 (m, 1H), 1.03 (s, 9H). $^{13}$C NMR (126 MHz, Benzene-d$_6$) δ 144.13, 138.61, 138.37, 138.09, 138.06, 137.86, 137.27, 136.59, 135.99, 133.40, 131.33, 128.56, 128.49, 128.41, 123.55, 123.37, 121.38, 121.21, 120.95, 119.41, 118.50, 108.68, 87.92, 52.58, 51.35, 47.21, 45.82, 40.22, 36.61, 25.06, 21.25, 21.16.

Ethylene/1-Octene Polymerization Procedures

A 2 L Parr reactor was used for all polymerization experiments. The reactor was heated via an electrical heating mantle and was cooled via an internal serpentine cooling coil containing water. Both the reactor and the heating/cooling system were controlled and monitored by a Camile TG process computer. All chemicals used for polymerization or catalyst makeup were run through purification columns. 1-octene, toluene, and Isopar-E (a mixed alkanes solvent available from ExxonMobil, Inc.) were passed through 2 columns, the first containing A2 alumina, and the second containing Q5 reactant (available from Engelhard Chemicals Inc.). Ethylene gas was passed through 2 columns, the first containing A204 alumina and activated 4A° molecular sieves, the second containing Q5 reactant. Hydrogen gas was passed through Q5 reactant and A2 alumina. Nitrogen gas was passed through a single column containing A204 alumna, activated 4A° molecular sieves and Q5 reactant. Catalyst solutions were handled in a nitrogen-filled glovebox.

The shot tank was filled with ISOPAR-E and 1-octene to the load setpoints by use of an Ashcroft differential pressure cell, and the material was injected into the reactor. Hydrogen (as specified) was loaded into the reactor, via a shot tank with an internal volume of approximately 75 mL, immediately following the solvent/comonomer addition. The reactor was then heated up to the polymerization temperature setpoint. Subsequently, MMAO-3A (used at low levels (<40 equiv.) exclusively as a scavenger,10 µmol) solution was added to the reactor via the shot tank. Next, ethylene was added to the specified pressure as monitored via a micromotion flow meter. Finally, dilute toluene solutions of catalyst were transferred to the shot tank, and added to the reactor to begin the polymerization reaction. The polymerization conditions were typically maintained for 10 min with supplemental ethylene added on demand to maintain the specified pressure. Exothermic heat was continuously removed from the reaction vessel via the internal cooling coil. The resulting solution was removed from the reactor and stabilized by addition of 5 mL of a toluene solution containing approximately 33.5 mg of a hindered phenol antioxidant (IRGANOX 1010 from Ciba Geigy Corp.) and 66.5 mg of a phosphorus stabilizer (IRGAFOS 168 from Ciba Geigy Corp.). Polymers were recovered by drying for about 12 hours in a temperature-ramped vacuum oven with a final set point of 140° C. Between polymerization runs, a wash cycle was conducted in which of ISOPAR-E (850 g) was added and the reactor was heated to 160° C. The reactor was then emptied of the heated solvent immediately before beginning a new polymerization run.

GPC Analysis

High temperature gel permeation chromatography analysis (HT-GPC) was carried out on polyolefin polymer samples in order to evaluate molecular weight distribution. The polymer samples were dissolved by heating for 120 minutes at 160° C. in 1,2,4-trichlorobenzene (TCB, stabilized by 300 ppm of butylated hydroxyl toluene (BHT)) at a concentration of 10 mg/mL. Each sample was then diluted to 1 mg/mL immediately before the injection of a 250 µL aliquot of the sample. The GPC was equipped with two Polymer Labs PLgel 10 µm MIXED-B columns (300×10 mm) at a flow rate of 2.0 mL/minute at 160° C. Sample detection was performed using a PolyChar IR4 detector in concentration mode. A conventional calibration of narrow polystyrene (PS) standards was utilized with apparent units adjusted to homo-polyethylene (PE) using known Mark-Houwink coefficients for PS and PE in TCB at this temperature.

IR Analysis

Infrared spectroscopy analysis was carried out on polyolefin polymer samples in order to determine the degree of alpha-olefin incorporation. Aliquots of the 10 mg/mL stock solution used for GPC sample preparation were deposited in separated wells of a 48-well HT silicon wafer using a Tecan MiniPrep 75 deposition station, and the 1,2,4-trichlorobenzene was evaporated off the deposited wells of the wafer at 160° C. under nitrogen purge. The stock solutions were heated to 160° C. during the deposition process in order to prevent polymer precipitation. 1-Octene analysis was performed on the HT silicon wafer using a NEXUS 670 E.S.P. FT-IR.

A batch reactor campaign was run for selected catalysts listed in Table 1. A summary of relevant results is reported in Table 1. Table 2 provides data for the polymers produced in the Comparative and Inventive Process Examples shown in Table 1.

TABLE 1

| Process Example | Catalyst Name | µmoles | Metal | ΔH$_2$ psi | MMAO-3A µmol | Ethylene (g) Initial | Ethylene (g) Added | Yield (g) | Efficiency (gpoly/gMetal) |
|---|---|---|---|---|---|---|---|---|---|
| Comp. Ex. A | Catalyst 1 | 0.3 | Sc | 90 | 10$^a$ | 38.4 | 11.4 | 16 | 1,195,828 |
| Comp. Ex. B | Catalyst 1 | 1.8 | Sc | 0 | 10$^a$ | 41 | 0 | 1.1 | 13,702 |
| Inv. Ex. 1 | Catalyst 2 | 0.3 | Sc | 0 | 10$^a$ | 41.3 | 14 | 18.9 | 1,412,572 |
| Inv. Ex. 2 | Catalyst 2 | 0.3 | Sc | 180 | 10$^a$ | 38.4 | 11 | 15.5 | 1,149,274 |

TABLE 1-continued

| Process Example | Catalyst Name | Catalyst μmoles | Catalyst Metal | ΔH₂ psi | MMAO-3A μmol | Ethylene Initial (g) | Ethylene Added (g) | Yield (g) | Efficiency (gpoly/gMetal) |
|---|---|---|---|---|---|---|---|---|---|
| Inv. Ex. 3 | Catalyst 2 | 0.3 | Sc | 0 | 10$^a$, 90$^b$ | 41.2 | 0 | 0.5 | 37,370 |
| Inv. Ex. 4 | Catalyst 2 | 15 | Sc | 0 | 0 | 39 | 35.2 | 60.2 | 89,273 |
| Inv. Ex. 5 | Catalyst 2 | 8 | Sc | 0 | 0 | 39.3 | 3.3 | 8.2 | 22,800 |
| Inv. Ex. 6 | Catalyst 4 | 0.3 | Sc | 0 | 10$^a$ | 41.6 | 14.4 | 18.9 | 1,412,572 |
| Inv. Ex. 7 | Catalyst 3 | 0.3 | Sc | 0 | 10$^a$ | 41.4 | 11 | 14.7 | 1,098,667 |
| Inv. Ex. 8 | Catalyst 5 | 3 | Y | 0 | 10$^a$ | 41.1 | 2.1 | 6.3 | 23,620 |
| Inv. Ex. 9 | Catalyst 5 | 6.5 | Y | 0 | 10$^a$ | 41.1 | 8.4 | 11.9 | 20,592 |
| Inv. Ex. 10 | Catalyst 6 | 5 | Er | 0 | 10$^a$ | 41.3 | 8.3 | 11.4 | 13,632 |
| Inv. Ex. 11 | Catalyst 7 | 4.5 | Lu | 0 | 10$^a$ | 41.3 | 10.1 | 16.4 | 20,829 |

Conditions: 140° C., 605 g ISOPAR-E, 300 g 1-octene, 288 psi ethylene, 10 min run time
$^a$MMAO-3A added to the reactor as a scavenger prior to addition of catalyst solution.
$^b$MMAO-3A premixed with catalyst as an activator prior to injection into the reactor.

TABLE 2

| Process Example | Tg (° C.) | Tm (° C.) | Mw | Mw/Mn | Octene mol % |
|---|---|---|---|---|---|
| Comp. Ex. A | −18.31 | 121.8 | 57,432 | 2.08 | 1.1 |
| Comp. Ex. B | — | — | — | — | — |
| Inv. Ex. 1 | −17.13 | 120.7 | 161,841 | 2.08 | 0.8 |
| Inv. Ex. 2 | — | 121.8 | 34,454 | 2.04 | 1.3 |
| Inv. Ex. 3 | — | — | — | — | — |
| Inv. Ex. 4 | — | 117.1 | 80,961 | 2.86 | 2.1 |
| Inv. Ex. 5 | — | 120.1 | 123,446 | 2.51 | 1 |
| Inv. Ex. 6 | — | 117.4 | 195,024 | 2.10 | 1.3 |
| Inv. Ex. 7 | — | 116.7 | 195,981 | 2.01 | 1.3 |
| Inv. Ex. 8 | — | 112.3 / 118.6 | 16,735 | 9.32 | 4.4 |
| Inv. Ex. 9 | — | 112.4 / 119.4 | 27,519 | 16.29 | 4.8 |
| Inv. Ex. 10 | — | 110.8 / 117.6 | 8,322 | 5.88 | 5.2 |
| Inv. Ex. 11 | — | 111.8 / 117.6 | 9,858 | 3.76 | 4.1 |

Comparative Example 1 showed the prior art Catalyst 1 with dihydrogen activation. Comparative Example 2 shows Catalyst 1 without dihydrogen; under these conditions, no ethylene uptake was observed. Inventive Example 1 shows Catalyst 2 polymerizes monomers without an activator. Inventive Example 2 shows the detrimental effect of dihydrogen on polymer molecular weight. Inventive Example 3 shows that MMAO at activator levels inhibits ethylene uptake for Catalyst 2. Inventive Examples 4 and 5 shows that MMAO is not necessary for polymerizations. At higher loadings, Catalyst 2 acts as a scavenger as well as a catalyst that can polymerize monomer. The lack of MMAO or any other activator supports that this system does not require an activator. Inventive Examples 6-11 are further examples of other catalyst analogues.

The present invention may be embodied in other forms without departing from the spirit and the essential attributes thereof, and, accordingly, reference should be made to the appended claims, rather than to the foregoing specification, as indicating the scope of the invention.

We claim:

1. A process for producing a polyolefin comprising contacting one or more olefinic monomers in at least one reactor in the presence of one or more catalysts and in the absence of an activation agent, wherein one or more of the catalysts has the following structure:

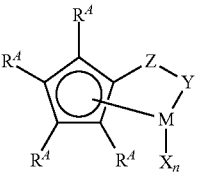

wherein M is a Group III or Lanthanide metal that is in a +3 formal oxidation state;

each $R^A$ independently is selected from the group consisting of $(C_1-C_{40})$hydrocarbyl,; $(C_1-C_{40})$heterohydrocarbyl; $Si(R^B)_3$; halogen atom; hydrogen atom; and any combination thereof;

optionally two or more $R^A$ groups can combine together into one or more ring structures, with such ring structures having from 3 to 50 atoms in each ring structure excluding any hydrogen atoms;

Z is $[(R^D)_nG]_m$, wherein m is 1, 2 ,3, or 4, and G is independently selected from carbon, silicon, germanium or boron; and when G is carbon, silicon, or germanium, n is 2; when G is boron, n is 1;

Y is bonded to M and Z and is selected from the group consisting of —O—, —S—, —NR$^E$—, and —PR$^E$—;

each $R^B$, $R^D$, or $R^E$ independently is $(C_1-C_{30})$hydrocarbyl or $(C_1-C_{30})$heterohydrocarbyl;

each X is independently monoanionic or neutral wherein n is greater than 0, and each X is independently $(C_1-C_{40})$hydrocarbon, $(C_1-C_{40})$heterohydrocarbon, $(C_1-C_{40})$hydrocarbyl; $(C_1-C_{40})$heterohydrocarbyl; $Si(R^C)_3$; halogen atom; or hydrogen atom;

each $R^C$ independently is $(C_1-C_{30})$hydrocarbyl or $(C_1-C_{30})$heterohydrocarbyl;

each of the hydrocarbyl, heterohydrocarbyl, $Si(R^C)_3$, hydrocarbylene, and heterohydrocarbylene groups independently is unsubstituted or substituted with one or more $R^S$ substituents;

each $R^S$ independently is a halogen atom; polyfluoro substitution; perfluoro substitution; unsubstituted $(C_1-C_{18})$alkyl; or two of the $R^S$ are taken together to form an unsubstituted $(C_1-C_{18})$alkylene, wherein each R independently is an unsubstituted $(C_1-C_{18})$alkyl; and $R^C$ or $R^S$ optionally have an additional interaction with M.

2. The process according to claim 1, wherein X is $(C_1-C_{40})$hydrocarbyl, $(C_1-C_{40})$heterohydrocarbyl, $Si(R^C)_3$, or a hydrido group.

3. The process according to claim 1, wherein X is a substituted benzyl or substituted heteroarylbenzyl.

4. The process according to claim 3 wherein X is selected from the group consisting of

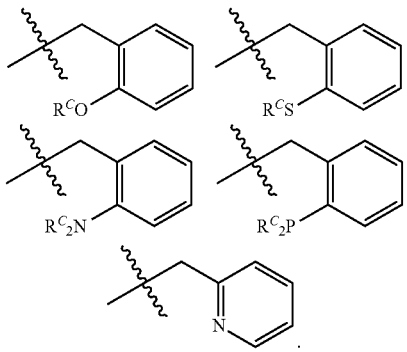

5. The process according to claim 1, wherein the one or more olefinic monomers comprises ethylene.

6. The process according to claim 1, wherein the one or more olefinic monomers is a α-olefin.

7. The process according to claim 1, wherein one of the one or more olefinic monomers is a diene.

8. The process according to claim 1 any one of the preceding claims, wherein the one or more catalysts comprises one or more of the following:

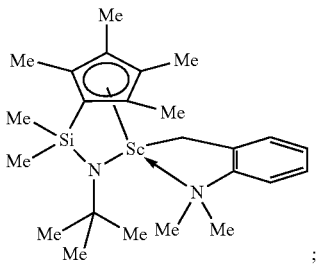

;

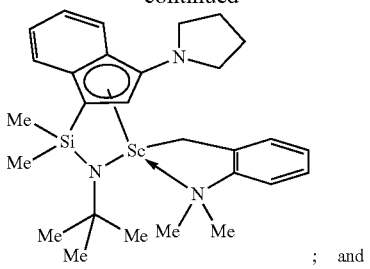

; and

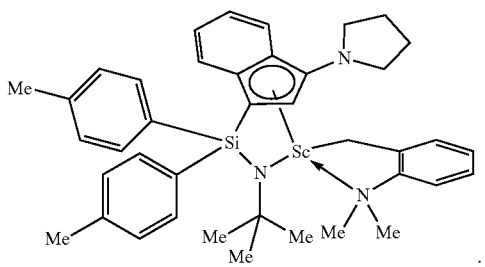

.

9. The process according to claim 1, wherein the process is conducted in one or more polymerization process selected from the group consisting of solution phase polymerization process, gas phase polymerization process, and slurry phase polymerization.

10. The process according to claim 1, wherein the process is conducted in more than one reactor connected in series or parallel.

* * * * *

UNITED STATES PATENT AND TRADEMARK OFFICE
CERTIFICATE OF CORRECTION

| | | |
|---|---|---|
| PATENT NO. | : 10,465,020 B2 | Page 1 of 1 |
| APPLICATION NO. | : 15/577562 | |
| DATED | : November 5, 2019 | |
| INVENTOR(S) | : Jasson T. Patton and Todd D. Senecal | |

It is certified that error appears in the above-identified patent and that said Letters Patent is hereby corrected as shown below:

In the Claims

Column 49, Line 27, Claim 8:
"8. The process according to claim 1 any one of the"

Should read:
--8. The process according to claim 1, wherein the one--.

Column 49, Line 28, Claim 8:
"preceding claims, wherein the one or more catalysts com-"

Should read:
--or more catalysts comprises one or more of the following:--.

Signed and Sealed this
Fifteenth Day of December, 2020

Andrei Iancu
*Director of the United States Patent and Trademark Office*